US007346876B2

(12) United States Patent
Chan et al.

(10) Patent No.: US 7,346,876 B2
(45) Date of Patent: Mar. 18, 2008

(54) ASIC HAVING DENSE MASK-PROGRAMMABLE PORTION AND RELATED SYSTEM DEVELOPMENT METHOD

(75) Inventors: Andrew K. Chan, Palo Alto, CA (US); Thomas M. Chan, Saratoga, CA (US); Po Weng Chiu, Campbell, CA (US)

(73) Assignee: Darien K. Wallace, Brentwood, CA (US)

( * ) Notice: Subject to any disclaimer, the term of this patent is extended or adjusted under 35 U.S.C. 154(b) by 684 days.

(21) Appl. No.: 10/944,323

(22) Filed: Sep. 17, 2004

(65) Prior Publication Data

US 2005/0041149 A1    Feb. 24, 2005

Related U.S. Application Data

(63) Continuation-in-part of application No. 10/235,628, filed on Sep. 4, 2002.

(51) Int. Cl.
*G06F 17/50* (2006.01)
*G06F 19/00* (2006.01)
*G06F 11/00* (2006.01)
*H03K 19/173* (2006.01)
*H01L 25/00* (2006.01)

(52) U.S. Cl. .............................. 716/8; 716/16; 326/38; 326/41; 326/47; 700/121; 714/3

(58) Field of Classification Search .................... 716/8, 716/16; 326/38, 41, 47; 700/121; 714/3
See application file for complete search history.

(56) References Cited

U.S. PATENT DOCUMENTS

| 4,625,311 | A | * | 11/1986 | Fitzpatrick et al. | ......... 714/725 |
|---|---|---|---|---|---|
| 5,732,246 | A | * | 3/1998 | Gould et al. | ................... 716/16 |
| 6,150,837 | A | * | 11/2000 | Beal et al. | ..................... 326/39 |
| 6,334,207 | B1 | * | 12/2001 | Joly et al. | ...................... 716/17 |
| 6,625,788 | B1 | * | 9/2003 | Vashi et al. | ..................... 716/6 |
| 6,694,491 | B1 | | 2/2004 | Osann, Jr. et al. | ............... 716/2 |
| 6,769,109 | B2 | | 7/2004 | Osann, Jr. et al. | ............ 716/17 |
| 7,055,125 | B2 | * | 5/2006 | Osann et al. | .................. 716/16 |
| 7,165,230 | B2 | * | 1/2007 | Park | .............................. 716/3 |
| 2002/0184452 | A1 | | 12/2002 | Simmons et al. | ........... 711/150 |
| 2003/0212979 | A1 | * | 11/2003 | Osann et al. | .................. 716/16 |
| 2005/0030425 | A1 | * | 2/2005 | Nagakura et al. | ........... 348/553 |
| 2005/0280438 | A1 | * | 12/2005 | Park | ............................ 326/41 |

\* cited by examiner

*Primary Examiner*—Phallaka Kik
(74) *Attorney, Agent, or Firm*—Imperium Patent Works; T. Lester Wallace

(57) ABSTRACT

A method is disclosed whereby an inexpensive integrated circuit is provided for use in high volume electronic consumer devices of different makes, wherein each different make must perform a different special function. A common function required in all the different makes is realized in a substantially non-customizable portion. A dense mask-programmable portion is provided for realizing a special function. Interface circuitry is provided that enables an external FPGA to perform the special function at system operating speeds during system development. After system development, the circuitry implemented in the external FPGA is technology-mapped to the mask-programmable portion. A single mask is fashioned such that versions of the integrated circuit are produced with their mask-programmable portions customized to perform the special function. I/O terminals that were used to couple to the external FPGA during system development are usable during normal operation to provide system board access to circuitry within the mask-programmable portion.

17 Claims, 16 Drawing Sheets

PGA FLOORPLAN

SUPERCELL STRUCTURE

SRAM UNDER
INTERCONNECT

VERTICAL PASS VIA

HORIZONTAL PASS VIA

SRAM CELL

SRAM BLOCK

(READ DECODER PORTION)

I/O CELL STRUCTURE

MACROCELL STRUCTURE

BUFFER AND CLOCK CELL STRUCTURE

BALANCED CLOCK TREE

ASIC HAVING DENSE MASK-PROGRAMMABLE PORTION AND RELATED SYSTEM DEVELOPMENT METHOD

CROSS REFERENCE TO RELATED APPLICATION

This application is a continuation-in-part of, and claims the benefit under 35 U.S.C. §120 of, U.S. patent application Ser. No. 10/235,628, now U.S. patent application Publication No. 2004/0041918 by Chan et al., entitled "Display Processor Integrated Circuit With On-Chip Programmable Logic For Implementing Custom Enhancement Functions," filed Sep. 4, 2002 (the subject matter of the above-identified patent application is incorporated herein by reference).

FIELD OF THE INVENTION

This application relates to application specific integrated circuits (ASICs) for use in electronic consumer devices, and more particularly to an ASIC that has a mask-programmable gate array portion and that is suitable for use in high volume production of electronic consumer devices.

BACKGROUND INFORMATION

The manufacture of electronic consumer devices is generally a very cost sensitive endeavor. Even a small reduction in manufacturing cost can result in a large savings when millions of units are manufactured. Where consumers have the option of purchasing competing electronic consumer devices with similar functionalities, price competition can be extreme. In such situations, having an ability to reduce manufacturing cost in relation to the manufacturing cost of the competition is especially desirable. Most of the reduced manufacturing cost can be passed on to the consumer, thereby resulting in increased sales and therefore also profits for the manufacturer. Alternatively, the bulk of the savings in manufacturing cost can be retained as increased profits for the manufacturer.

Consider one specific example in which the type of electronic consumer device is a television. Even though there are many different styles and models of televisions, many televisions have very similar electronic components within them. Each individual television manufacturer generally wants to incorporate his own special enhancement features into his televisions to differentiate his televisions from the televisions of the competition, but most of the functionality of the different televisions on the market is often identical. Due to economies of scale, the integrated circuits that make up the electronics of the televisions can generally be manufactured for a smaller unit cost when they are manufactured in larger volumes. It is therefore sometimes desirable for the televisions of different manufacturers to be made from a common set of electronics parts such that the electronics parts can be made in higher volumes and so that the per unit cost of the electronics parts can be reduced.

If televisions are to be made from common electronic parts, then a problem remains of how to provide each manufacturer the ability to provide his own special enhancement features. One manufacturer may want to provide one special enhancement feature, whereas another manufacturer may want to provide a different special enhancement feature. Television manufacturers generally consider the enhancement features proprietary because the inclusion of these enhancement features may in the eyes of consumers help differentiate the electronic consumer device of one manufacturer from all other electronic consumer devices on the market.

One potential solution might be to provide the common functionality in the form of a common integrated circuit. Due to the use of the common integrated circuit across multiple different makes and models of the electronic consumer device, the per unit cost of providing the common functionality might be reduced. The custom functionality would, on the other hand, be provided by including a field programmable gate array (FPGA) into each electronic consumer device that is to have a special enhancement feature. The FPGA would be relatively expensive, but it would be programmable in accordance with the particular needs of each individual manufacturer. Not only would including the separate FPGA integrated circuit in each electronic consumer device be expensive, but the intercommunication between the FPGA and the common integrated circuit might require a large number of input/output terminals (I/O terminals), thereby further increasing system cost. A better solution is desired.

Another potential solution might be to integrate the circuitry that performs the common functionality along with an amount of programmable logic. The programmable logic would be usable by each individual manufacturer to realize that manufacturer's special enhancement feature. This integration would reduce the cost associated with providing intercommunication between the common functionality part and the programmable logic part, but the amount of integrated circuit area used to realize the programmable logic part would be relatively large. If, for example, the programmable logic part would be realized as an antifuse-based FPGA technology, then the circuitry would be undesirably large due to the need to have large programming transistors. Large programming transistors are generally needed to supply programming currents needed to program antifuses in antifuse-based FPGAs. Not only would the programmable logic be undesirably large due to the presence of large programming transistors, but the antifuse-based FPGA solution would be undesirable because manufacturing antifuse-based FPGAs often requires special fabrication processes. The need to have special fabrication processes performed by a semiconductor fabrication facility often results in the semiconductor fabrication facility charging more to fabricate the integrated circuit.

If, on the other hand, the programmable logic portion would be realized in an SRAM-based FPGA technology, then the circuitry would be undesirably large due to the need to provide a large number of memory structures. A large number of memory structures is needed in an SRAM-based FPGA technology to store configuration data. Laser programmable gate array technologies are known, but devices made using these technologies are expensive and slow to produce and may have yield and other problems. Laser programming is really more suited prototyping purposes than it is for high production purposes. Accordingly, a field programmable gate array technology would allow an individual manufacturer to customize a programmable portion of his own integrated circuits to realize his own special enhancement feature, but the resulting integrated circuits would likely be larger, and therefore more expensive, than would be economically feasible in a high volume electronic consumer device situation.

SUMMARY

A novel integrated circuit comprises a substantially non-customizable hardware portion and a programmable gate array portion. The substantially non-customizable hardware portion includes circuitry that performs a common function. The common function is present across many makes and models of a type of electronic consumer device. The programmable gate array portion is a portion of the integrated circuit that can be customized to realize a special enhancement feature desired by a particular manufacturer of electronic consumer devices. In this way, a first particular manufacturer of an electronic consumer device can have the integrated circuit manufactured so that a first enhancement feature is realized in the programmable gate array portion of the integrated circuits made for the first manufacturer. A second particular manufacturer of electronic consumer devices can have the integrated circuit manufactured so that a second enhancement feature is realized in the programmable gate array portion of the integrated circuits made for the second manufacturer. Economies of scale associated with manufacturing the integrated circuit in greater volumes is taken advantage of while at the same time providing individual manufacturers of electronic consumer devices the ability to provide their own special enhancement features.

The programmable gate array portion is made of a factory-mask-programmable gate array architecture. The programmable gate array portion is therefore very dense and small. Its interconnect does not depend on the programming of antifuses. It therefore does not include large programming transistors of an antifuse-based FPGA. Its interconnect is not SRAM-based and its macrocells are not LUT-based. It therefore does not include a large number of memory cells for storing configuration data.

Attempting to provide an enhancement function in a mask-programmable technology might be considered undesirable and an unduly expensive. During development of a electronic consumer device, it might appear that a run of wafers of the integrated circuit would have to be made with a special mask such that the programmable portion of the integrated circuit could be programmed to perform its desired function in the system being developed. In one example, the programmable portion has to work at hardware operating speeds in conjunction with the remainder of the integrated circuit and the system being developed. Software emulation tools cannot therefore often be used to receive the signals going into the programmable portion and to generate therefrom the output signals that are to be supplied back to the remainder of the integrated circuit. It would appear that multiple runs of the integrated circuit might have to be made and then tested in the system before the system could be verified to function properly. The inability to use software emulation tools and a need to test a real system at speed during system development would appear to make realizing an enhancement feature in a mask-programmable gate array architecture unrealistically expensive and cumbersome.

In accordance with a first novel aspect, interface circuitry is provided on the integrated circuit along with the mask-programmable gate array portion and the substantially non-customizable hardware portion. During system development, the integrated circuit is placed in a test mode. In the test mode, the interface circuitry receives signals from the non-customizable hardware portion that would otherwise in normal operation be supplied into the programmable gate array portion of the integrated circuit. The interface circuitry outputs those signals onto first terminals of the integrated circuit package. A field programmable gate array (FPGA) external to the integrated circuit receives the signals from the first terminals. The external FPGA functions in the place of the programmable gate array portion of the integrated circuit. The external FPGA receives the signals from the first terminals, and generates therefrom output signals. The output signals are supplied back onto second terminals of the integrated circuit package. The interface circuitry receives the output signals from the second terminals and supplies those output signals to the substantially non-customizable hardware portion in the place of output signals that would otherwise be output in normal operation from the programmable gate array portion. Operation in the test mode therefore allows an external commercially-available FPGA to perform the function of the mask-programmable gate array portion embedded within the integrated circuit. Because the external FPGA realizes the function in hardware, operation of the FPGA is adequately fast to perform the operation of the mask-programmable gate array portion in a real-world system being developed. Because the commercially-available FPGA is manufactured in volume, it can be purchased and employed without a large expenditure. Similarly, development tools for programming the commercially-available and mass-produced FPGA are readily available as well as technical support and a large number of engineers who have previous experience in using the type of FPGA.

The development tools available from the FPGA manufacturer of the external FPGA are therefore usable to program or configure the external FPGA during the development of the system. In one example, a starting design is specified on the FPGA development system. The starting design may, for example, include a schematic of circuitry to be realized in the mask-programmable gate array portion of the integrated circuit. The starting design may alternatively be described in a hardware description language such as Verilog or VHDL. Regardless of how the starting design is specified, the starting design is technology-mapped to the hardware of particular external FPGA being used. The design is placed, and routed, and configuration information is generated that is usable to program the FPGA in the ordinary fashion that FPGAs are programmed. In the case of the external FPGA being an antifuse-based FPGA, the configuration information is used to program various antifuses of the FPGA to realize the functionality of the starting design. Multiple antifuse-based FPGAs can be programmed in this way, and tried one by one in the system being developed until the system operates as desired. In the case of the external FPGA being an SRAM-based FPGA, the same FPGA is repeatedly reloaded with configuration data. The FPGA is tested in the system and is then repeatedly reconfigured and retested until the system operates as desired. After operation of the integrated circuit in the system is satisfactory when the functionality of the mask-programmable gate array portion is performed by the external FPGA, the development tool is used to output information usable to fashion a mask such that the mask-programmable gate array portion can be made to realize the same function performed by the external FPGA. The starting design is technology-mapped to the hardware of the mask-programmable gate array portion. The design is placed, and routed. The development tool then outputs the information usable to make the mask. In one embodiment, this information is in the form of a GDS file.

The mask determines where conductive vias will be disposed and where conductive vias will not be disposed in a single layer of the integrated circuit. Where these conductive vias are present and are not present determines how logic circuitry of the customizable portion is interconnected.

The information output from the development system is used to make the mask, and the mask is used to make an integrated circuit such that the mask-programmable gate array portion of the integrated circuit performs in the system in the same way that the integrated circuit did in concert with the external FPGA. Because only one new mask must be made in order to make a customized version of the integrated circuit, production costs associated with providing customized integrated circuits to a particular manufacturer are reduced.

Due to the provision of the interface circuitry, it is not necessary for a manufacturer of electronic consumer devices to have multiple versions of the integrated circuit fabricated in order to develop an electronic consumer device system with a special enhancement feature. A first manufacturer of electronic consumer devices can have the integrated circuit made with the mask-programmable gate array portion customized to realize the first manufacturer's special enhancement feature, and a second manufacturer of electronic consumer devices can have the integrated circuit made with the mask-programmable gate array portion customized to realize the second manufacturer's special enhancement feature. For each manufacturer, only one version of the integrated circuit (and one customized mask) need be made for the manufacturer to develop and produce the overall system of which the integrated circuit is a part. The integrated circuit can operate in a system being developed at normal operating speeds due to the interface circuitry's coupling to an external FPGA.

In some embodiments, the first and second input/output terminals (I/O terminals) provided on the integrated circuit package for interfacing to the external FPGA during testing and development are later usable during normal integrated circuit operation for other purposes in the resulting system. The I/O terminals may, for example, be usable to provide access to the mask-programmable gate array portion of the integrated circuit so that the circuitry of the mask-programmable gate array portion performs another board level function and communicates with circuitry outside the integrated circuit via the I/O terminals. These I/O terminals and the mask-programmable gate array portion provide a way to fix bugs and errors on the system board of the electronic consumer device.

In some embodiments, the integrated circuit has input/output cells (interface cells) and associated input/output pads (interface pads) for coupling to the first and second I/O terminals of the package. The integrated circuit is packages to that these input/output cells (interface cells) and pads (interface pads) are bonded out to I/O terminals of the package. The packaged integrated circuit is then used during development of the system. The I/O terminals are used to couple to the external FPGA as described above. When the system is then later produced in high volume, the production version of the integrated circuit is packaged in a different way so that the input/output cells and pads are not bonded out to I/O terminals. This reduces the number of I/O terminals on the production version of the packaged integrated circuit. Manufacturing costs of the production version of the electronic consumer device is therefore reduced.

In accordance with a second novel aspect, a customizable ASIC includes a substantially non-customizable hardware portion and a mask-programmable gate array portion. The mask-programmable gate array portion receives pixel data from the substantially non-customizable hardware portion in multiple color space formats (for example, in the YCbCr 4:4:4 color space format and in the RGB color space format). Providing pixel data to the mask-programmable gate array portion in multiple color space formats makes the mask-programmable gate array portion more versatile in that certain enhancement functions are more easily performed on pixel data in one color space format, whereas other enhancement functions are more easily performed on pixel data in another color space format.

Other embodiments and advantages are described in the detailed description below. This summary does not purport to define the invention. The invention is defined by the claims.

DETAILED DESCRIPTION

Figure 1:
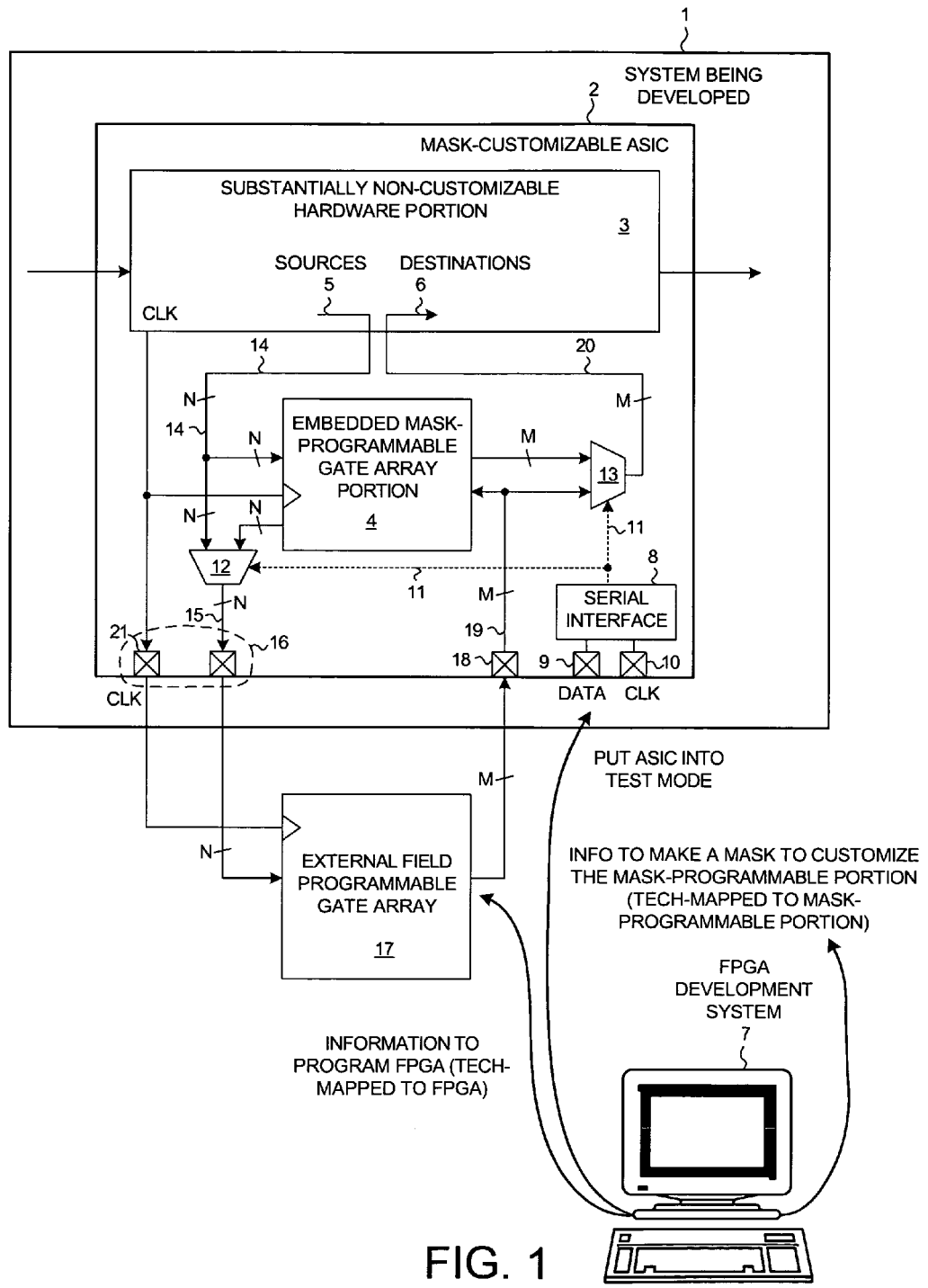
FIG. 1 is a simplified diagram of a method and novel integrated circuit in accordance with one embodiment.

FIG. 1 is a simplified high level diagram in accordance with one embodiment. An electronic consumer device system 1 is being developed by a first manufacturer of electronic consumer devices. System 1 includes a mask-customizable application specific integrated circuit (ASIC) 2. Integrated circuit 2 performs a significant data processing function in system 1 that is also performed in other electronic consumer device systems made by other manufacturers. In one example in which the electronic consumer device is a television, the common function may include a deinterlacer function, a noise reduction function, a scaler function, a gamma correction function, a digital-to-analog converter function, and an on-screen display function. The common function is performed by a substantially non-customizable hardware portion 3. Substantially non-customizable portion 3 receives inputs from the system and generates outputs to the system. In one example, substantially non-customizable portion 3 is realized using standard cell fabrication technology.

Integrated circuit 2 further includes a factory mask-programmable gate array portion 4. Mask-programmable gate array portion 4, rather than being implemented in standard cells, is laid out as full custom circuitry. The mask-programmable gate array portion 4 is capable of receiving input signals from the substantially non-customizable hardware portion 3, of performing a desired function using those input signals, and of generating output signals. The output signals are supplied back to the substantially non-customizable hardware portion 3. In the illustration, arrow tail 5 represents the sources of the input signals that serve as the input signals to the mask-programmable gate array portion 4. In the illustration, arrow head 6 represents destinations at which the output signals generated by the mask-programmable gate array portion 4 are supplied back to the substantially non-customizable hardware portion. Although the sources and destinations are each illustrated as points, in actuality the sources involve signals taken from many places in the substantially non-customizable hardware portion 3 and the destinations involve signals being injected into many different places in the substantially non-customizable hardware portion 3.

In addition to substantially non-customizable hardware portion 3 and mask-programmable gate array portion 4, integrated circuit 2 further includes interface circuitry. In the illustration, the interface circuitry is the remainder of the circuitry of integrated circuit 2 that is not the substantially non-customizable hardware portion 3 or the mask-programmable gate array portion 4.

Integrated circuit 2 is capable of operation in a test mode and in a normal operation mode. To develop system 1, integrated circuit 2 is placed into system 1. At this time, integrated circuit 2 is not yet mask-programmed to perform a special enhancement function in the system. The interface circuitry is placed into the test mode. In the present example, this is done by having a field programmable gate array (FPGA) development system 7 communicate via a serial bus with a serial interface 8 of the interface circuitry. Serial interface 8 receives the communication from the FPGA development system 7 via a pair of input/output terminals (I/O terminals) 9 and 10 of the interface circuitry. I/O terminal 9 is a data terminal DATA. I/O terminal 10 is a clock terminal CLK. Serial interface 8 receives the communication and sets a bit in a configuration register (not shown). The digital content of this configuration register bit is supplied via line 11 to multiplexers 12 and 13 of the interface circuitry. Multiplexer 12 is controlled such that the input signals sourced from sources 5 within non-customizable hardware portion 3 are supplied via lines 14 (output leads of portion 3), through multiplexer 12, lines 15 onto first I/O terminals 16 of the interface circuitry. A clock signal that is synchronous with the information content on lines 15 is supplied onto a clock output terminal CLK 21 of the first I/O terminals 16. The input signals on first I/O terminals 16 are in turn supplied by external connections to I/O terminals of an external FPGA 17. In the present example, external FPGA 17 is a commercially-available FPGA that is widely used and whose operation is understood many engineers. Development tools for programming FPGA 17 are widely available and understood. Due to the operation of the interface circuitry, the input signals that will be supplied to the mask-programmable gate array portion 4 in the normal operation mode of integrated circuit 2 are supplied to external FPGA 17 in the test mode. In the test mode, multiplexer 13 is also controlled such that output signals supplied from FPGA 17 are conducted via external connections, to second I/O terminals 18, through lines 19, through multiplexer 13, and through lines 20 (input leads of portion 3) to the destinations 6 within substantially non-customizable hardware portion 3. Accordingly, the interface circuitry couples FPGA 17 to integrated circuit 2 so that circuitry inside FPGA 17 can take the place of (functionally during the test mode) mask-programmable gate array portion 4 as it will later be programmed for operation during the normal operation mode. The interface circuitry therefore constitutes a means for coupling an external FPGA to the integrated circuit such that the FPGA performs a function to be performed by the mask-programmable gate array portion of an otherwise substantially identical integrated circuit when the mask-programmable gate array portion of the otherwise substantially identical integrated circuit is mask-programmed and operating in a real system.

FPGA development system 7 is used to enter a description of a circuit design that will later be realized in mask-programmable gate array portion 4. The description can be entered in the form of a schematic. The description can be entered in the form of a hardware description language such as Verilog or VHDL. Using FPGA development system 7, the circuitry design is technology-mapped to the hardware of FPGA 17. It is placed, and routed. Timing verification is performed. Configuration information is then output from FPGA development system 7 and is supplied to external FPGA 17 so that FPGA 17 is configured or programmed to realize the desired circuit. FPGA 17 can be an FPGA of any suitable FPGA technology including, for example, an antifuse based technology, an SRAM-based technology, or an EEPROM-based technology, or a FLASH-based technology.

Once configured, external FPGA 17 operates in conjunction with the substantially non-customizable hardware portion 3 of integrated circuit 2 in the system being developed 1. Because FPGA 17 implements the circuit design in hardware, the system 1 can operate at full operating speed of system 1. If desired, the function of FPGA 17 can be changed by altering the circuit design on FPGA development tool 7, technology mapping, placing, routing and then reprogramming or reconfiguring FPGA 17. Substantially non-customizable hardware portion 3 performs a function in system 1 that is also common to other similar systems being developed by other manufacturers. FPGA 17, on the other hand, performs a special enhancement function desired by the particular manufacturer who is developing system 1.

Once FPGA 17 and integrated circuit 2 are operating correctly in system 1, then FPGA development tool 7 is used to generate information usable to make a semiconductor fabrication mask (or reticle if a step-and-repeat projection system is to be used in the fabrication of the integrated circuit). This information may, for example, be a typical GDS file. The mask or reticle is usable during the fabrication process of integrated circuit 2 such that mask-programmable gate array portion 4 is customized to perform the same function performed in the test mode by external FPGA 17. In one embodiment, only one layer of conductive vias is customized and only one new mask is made. The customization of the layer of conductive vias results in mask-programmable gate array portion 4 performing the same function performed in the test mode by external FPGA 17. Mask-programmable gate array portion 4 is very dense and therefore small and inexpensive to provide on integrated circuit 2. Mask-programmable gate array portion 4 is not an antifuse-based FPGA and therefore does not involve large programming transistors needed to supply programming current to antifuses during antifuse programming. Mask-programmable gate array portion 4 is not an SRAM-based FPGA and therefore does not involve the many memory cells needed in an SRAM-based FPGA architecture to store configuration data. Because only one layer of integrated circuit 2 requires customization, non-recurring engineering costs associated with providing a customized integrated circuit 2 to the manufacturer of system 1 is reduced. Because mask-programmable gate array portion 4 is dense, the unit cost of manufacturing the customized integrated circuit 2 is also low.

In the full production version of system 1, no FPGA 17 is provided. The functionality previously provided by FPGA 17 in the test mode is provided by customized programmable gate array portion 4. The interface circuitry powers up in its normal operation mode (not the test mode) and remains in the normal operation mode during normal operation of system 1. Transferability of the design from FPGA 17 to mask-programmable gate array portion 4 is facilitated by using synchronous design techniques in the design of the circuitry programmed into FPGA 17 and the circuitry configured into mask-programmable gate array portion 4. In one embodiment, both the circuitry programmed into FPGA 17 and the circuitry configured into mask-programmable gate array portion 4 are clocked by the same clock signal present on clock terminal CLK 21.

During operation in the normal operation mode, the first and second sets of I/O terminals 16 and 18 are not needed for interfacing to external FPGA 17. Accordingly, in some embodiments the first and second sets of I/O terminals 16 and 18 are usable during the normal operation mode to provide access to and from the mask-programmable gate array portion 4 so that a portion of the circuitry within mask-programmable gate array 4 can perform another board-level function. This portion of the circuitry of mask-programmable gate array portion 4 communicates with circuitry outside the integrated circuit via the I/O terminals. I/O terminals 16 and 18 therefore provide a way for the manufacturer of system 1 to fix bugs and errors on the system board of system 1. I/O terminals 16 and 18 can also be used to provide an additional function on the system board of system 1.

If the functionality afforded by mask-programmable gate array portion 4 to fix bugs and provide additional functions is not needed in the final system 1, then integrated circuit 2 can be packaged in its full production version in a package that does not include I/O terminals 16 and 18. The input/output cells and associated input/output pads on integrated circuit 2 that are provided for coupling to first and second I/O terminals 16 and 18 are not bonded out to package I/O terminals in the full production package. This reduces the number of package I/O terminals on the production version of the packaged integrated circuit, thereby reducing manufacturing costs of the production version of integrated circuit 2.

In the same way that a first manufacturer can use an FPGA development system to develop a first electronic consumer device system and then make a single mask (or reticle) such that the novel integrated circuit 2 functions in that system to perform both a common function as well as a first special enhancement function, so too can a second manufacturer use an FPGA development system to develop a second electronic consumer device and then make a single mask such that the novel integrated circuit 2 functions in that system to perform both the common function as well as a second special enhancement function. Although the method of FIG. 1 is described above in connection with system 1 being a television, the method is usable in the development of multiple other different types of systems. The method is envisioned to be especially useful in the development of cost-sensitive high-volume electronic consumer devices wherein an integrated circuit is to perform both a function common to many makes and models of the type of electronic consumer device as well as to perform a specific enhancement function present in only certain makes and/or models. The customization of the integrated circuit is done by only changing the details of a single layer within the mask-programmable gate array portion of the integrated circuit. The vast majority of the integrated circuit layout design work need not be redone in order to produce a customized version of the integrated circuit. Once one version of integrated circuit has designed, the additional cost associated of producing different customized versions of the integrated circuit is low, thereby making use of the integrated circuit design attractive to a large number of different manufacturers of similar electronic consumer devices.

ONE SPECIFIC EXAMPLE

Figure 2:
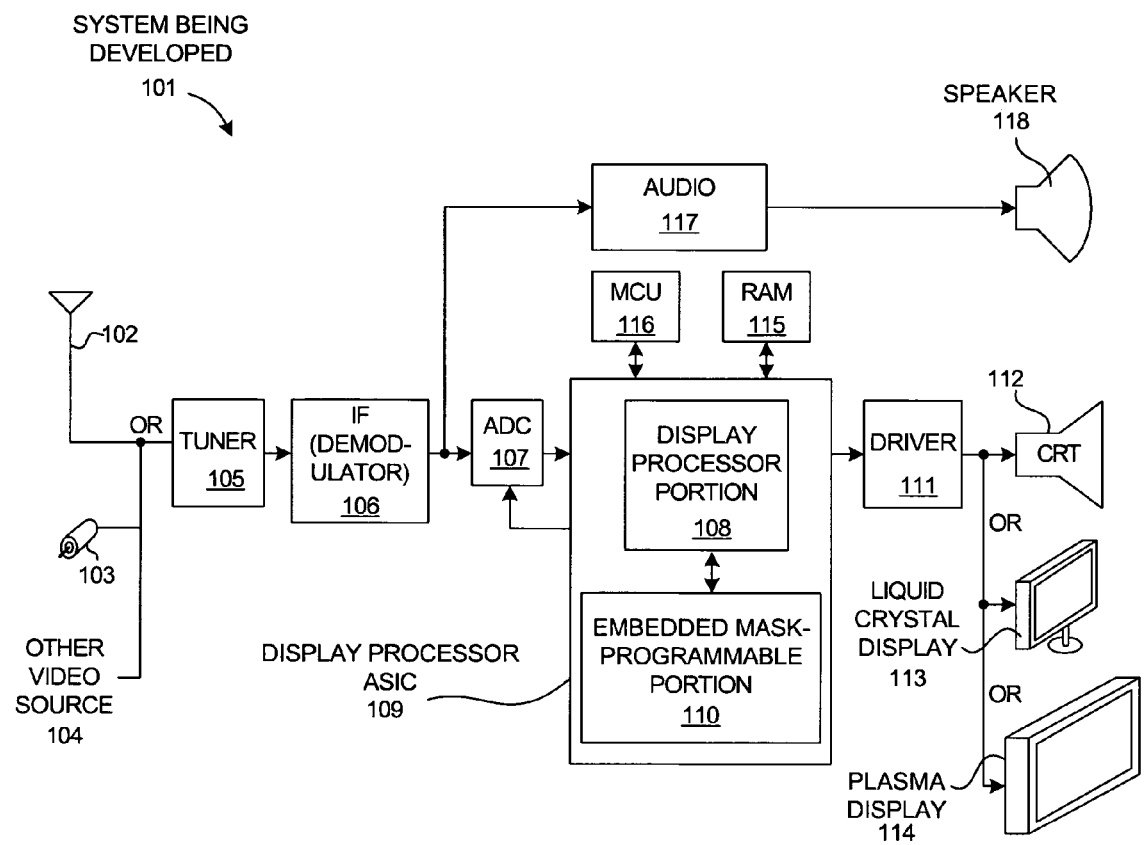
FIG. 2 is a simplified block diagram of a system being developed in accordance with the method and integrated circuit of FIG. 1.

FIG. 2 is a simplified system level diagram of the electronics of a video display system 101 in accordance with one specific example. An incoming signal is received onto the video display system, for example, from an antenna 102, a coaxial cable 103, or another video source 104. The signal passes through a tuner 105, an IF demodulator 106, an analog-to-digital converter 107, and to a display processor 108 within an integrated circuit 109. The display processor 108 performs deinterlacing and scaling. Display processor 108 is fabricated out of a mix of standard cell and full custom circuitry. A mask-programmable gate array portion 110 of integrated circuit 109, either independently or in concert with parts of the display processor 108, performs one or more enhancement functions. The resulting deinterlaced video signal is output from integrated circuit 109 to driver 111 and to a display device. The display device may, for example, be a cathode ray tube (CRT) 112, a liquid crystal display (LCD) screen 113, a plasma display 114 or other display device usable to view video. Frames of video information are stored in an external RAM 115. A microcontroller 116 is coupled to integrated circuit 109. Microcontroller 116 can control features and/or enhancement functions performed by integrated circuit 109. These features and/or enhancement functions may, for example, include Picture-In-Picture (PIP), Picture-Out-Picture (POP), Cinema 1, Cinema 2, format conversion, film detection, panorama scaling, alpha blending and overlay, VBI/Closed Captioning, On-Screen Display (OSD), and brightness adjusting. Audio passes through audio circuitry 117 and to speaker 118.

Figure 3A:
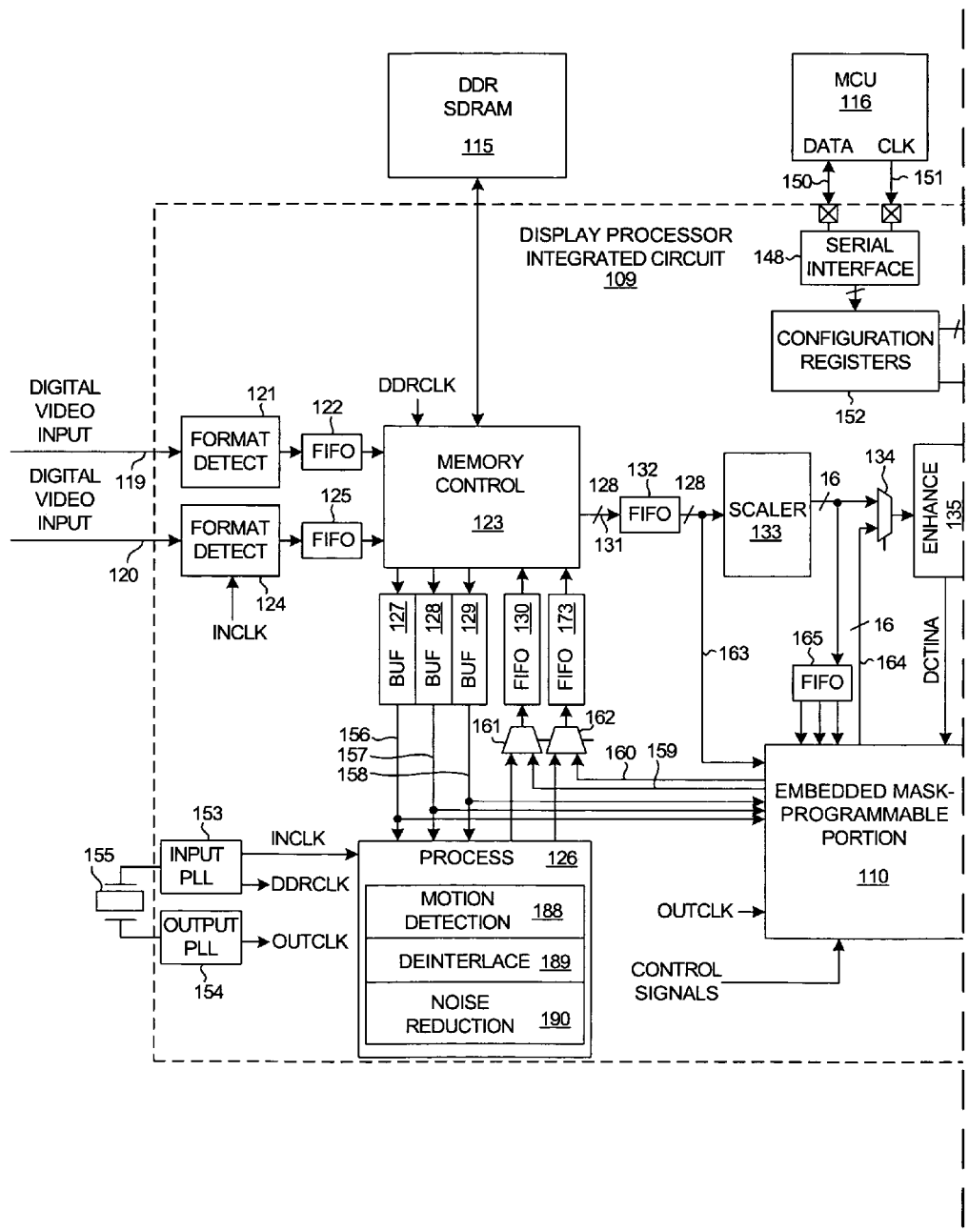
FIG. 3 is a more detailed block diagram of the integrated circuit of FIG. 2. The substantially non-customizable hardware portion occupies substantially more integrated circuit area than the mask-programmable gate array portion occupies. In one specific embodiment of the integrated circuit illustrated in FIG. 3, the substantially non-customizable hardware portion occupies approximately forty square millimeters of integrated circuit area whereas the mask-programmable gate array portion occupies approximately three square millimeters.
Figure 3B:
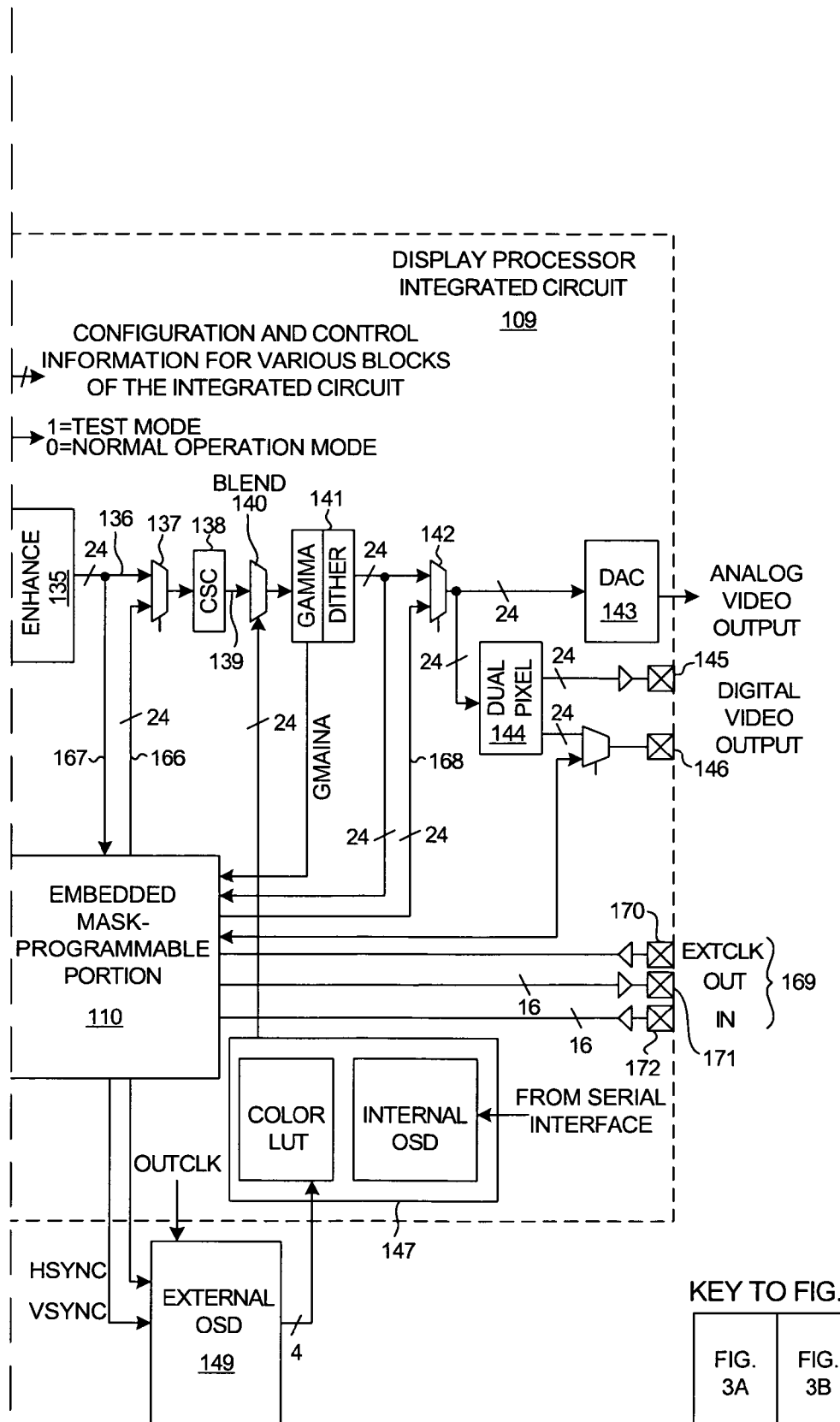

FIG. 3 is a more detailed diagram of integrated circuit 109 of FIG. 2. Integrated circuit 109 actually has two digital video input ports 119 and 120. A digital video signal received onto digital video port 119 passes through a format detector 121, through a FIFO 122, and to a memory control block 123. If a digital video signal is present on digital video port 120, then this second digital video signal passes through a second format detector 124, through a second FIFO 125, and to memory control block 123. In the example of FIG. 1, only one of the digital video ports, digital video port 119, is used. Consecutive frames of video pass through digital video input port 119, through format detector 121, through FIFO 122, through memory control block 123 and are stored in DDR SDRAM (double data rate synchronous dynamic random access memory) 115.

In one example, each frame of video is an NTSC video frame that includes 480 scan lines of pixels, where each row contains 720 pixels. (A line of pixels is sometimes called a row of pixels). In this example, a pixel involves two numbers: 1) an eight-bit luminance value, and 2) an eight-bit chrominance value. Each frame is made up of two fields. The first field includes the odd scan lines of the frame. The second field includes the even scan lines of the frame. The first field includes pixels of the video image at a time before the remainder of the image represented by the pixels of the second field. In the example of the hardware of FIG. 3, consecutive fields of consecutive frames are received and stored field by field into RAM 115.

It is desired to supply some video display devices with "deinterlaced" video in that the number of pixels in each field of pixels is to be doubled. For each 240 line by 720 pixels field supplied to integrated circuit 9, the integrated circuit is to output a frame of 480 lines by 720 pixels. To convert a 240 line by 720 pixel field (called the "field of interest") into a 480 line by 720 frame, corresponding blocks of three consecutive fields are taken out of RAM 115. Consider three corresponding blocks in three consecutive fields. The first field contains odd lines for a first frame (lines 1, 3, 5 and so forth) and the second field contains even lines (lines 2, 4, 6 and so forth) for the first frame. The third field is the first field containing odd lines (lines 1, 3, 5 and so forth) of the next frame. The middle field is the field of interest. The second block for which extra pixels are to be generated is a block from this field of interest. The number of lines of pixels within this block is doubled. The first block is a block for the same spatial location in the frame as the second block, only the first block is from the field immediately prior to the field of interest. The third block is a block for the same spatial location in the frame as the second block, only the third block is from the field immediately following the field of interest. Motion detection block 188 of process block 126 (see FIG. 3) uses the first and the third blocks to make a determination whether there is motion in the second block. If, for example, an object in the video that happens to be in the area of the picture defined by a block were to move position from one field to the next to the next, then motion might be detected.

If motion is not detected for the area of the picture defined by the second block, then temporal interpolation is used to create pixels in between the row of pixels of the second block. In the example where the second block contains even lines, the temporal interpolation process generates new pixels in the odd rows such that the number of pixels in the second block is doubled. These new pixels are to fill in the interline gaps between the even lines. These new pixels are determined by looking at the corresponding pixels in the first block and third block. This is called "temporal" interpolation because pixel information outside the time of the field of interest (the second block is from the field of interest) is used to interpolate and determine the new pixels.

If, on the other hand, motion is detected within the second block, then spatial interpolation is used to interpolate and fill in the odd lines in the second block. Spatial interpolation uses pixels in the same field as the second block to determine the new pixels. In this way, block after block within the field of interest is filled in such a way that the number of lines of pixels in the field of interest is increased from 240 even lines to 480 odd and even lines. The interpolation and generation of new pixels is performed by deinterlace block 189 of process block 126 (see FIG. 3).

The blocks of pixels used in the process described above are taken out of RAM 115 in multi-line blocks of pixels. A multi-line block of pixels is six 720 pixel lines. Each of buffers 127 and 129 is a buffer that stores six rows of pixels each. Buffer 128 is smaller. It stores five rows of pixels. Each of buffers 127, 128 and 129 is coupled to process block 126 by its own 128-bit wide bus.

As the blocks in the field of interest are processed, the interpolated new pixels are written into a FIFO 130. FIFO 130 is coupled to processor block 126 by a 128-bit wide bus. FIFO 130 is coupled to memory control block 123 by another 128-bit wide bus. Noise reduction results are output by noise reduction block 190 of process block 126 and are supplied to memory control block 123 via FIFO 173.

Once the interpolation process is completed for the block in the field of interest, then buffer 130 of newly interpolated pixels is stored by memory control block 123 in RAM 115.

When the resulting field of "deinterlaced" video is to be output, then the block of newly interpolated pixels is combined with the original block and the resulting "deinterlaced" block is output onto output bus 131 to FIFO 132. Each pixel is represented by sixteen bits, and eight pixels (all the pixels, both original and interpolated, in a column of the segment) are output onto bus 131 at the same time. Output bus 131 is 128 bits wide. FIFO 132 contains 960 such 128-bit wide words.

The deinterlaced lines of video pass through FIFO 132 and to scaler block 133. Scaler block 133 outputs each pixel in parallel as sixteen bits. Pixels are output by scaler block 133 and are supplied via multiplexer 134 to enhancement block 135. An example of an enhancement performed by enhancement block 135 is brightness adjustment. Each YCbCr 4:4:4 pixel is 24 bits wide, and pixels come out of enhancement block 135 pixel by pixel on a 24-bit wide bus 136. On each rising edge of OUTCLK, three 8-bit pixel values (one 8-bit Y pixel value, one 8-bit Cb pixel value, and one 8-bit Cr pixel value) can be present on bus 136. The pixels pass through multiplexer 137 to color space conversion block 138. Color space conversion block 138 performs, in this example, YCbCr 4:4:4 to RGB conversion. The pixels are output from color space conversion block 138 via a 24-bit wide bus 139 to a blending multiplexer 140. On each rising edge of OUTCLK, three 8-bit pixel values (one 8-bit R pixel value, one 8-bit G pixel value, and one 8-bit B pixel value) can be present on 24-bit bus 139. Blending multiplexer 140 provides the ability to multiplex in on-screen display overlay information. The pixels are output from blending multiplexer 140 to a gamma correction and dither block 141. The resulting pixels are output to multiplexer 142. If an analog video output signal is desired, then the pixel stream passes through a digital-to-analog converter (DAC) block 143 and is output from integrated circuit 109 in analog form. If a high definition digital television signal is desired, then the stream of pixels passes through dual pixel block 144 which doubles the number of bits simultaneously output from integrated circuit 109 from 24 bits to 48 bits. This also results in decreasing the rate at which information is output on terminals 145 and 146. On-screen display functionality is provided by block 147. The characters to display on the screen are supplied to block 147 from serial interface block 148. An external OSD (on-screen display) integrated circuit 149 is provided as an option if more on-screen display functionality and colors and fonts are desired. Microcontroller 116 controls the various blocks of integrated circuit 109 by sending a serial communication to serial interface 148 of integrated circuit 109 via a data line 150 and a clock line 151. Serial interface 148 in turn performs a write to the appropriate one of configuration registers 152. The digital content of the bits in the various configuration registers are supplied as control signals to the various other blocks to be controlled. The other blocks are therefore controllable or customized to a relatively small degree by setting bits in a configuration register, but fine-grained general-purpose low level macrocell logic within the blocks are not freely interconnectable in different ways by determining how a programmable interconnect structure interconnects those macrocells. The circuitry of these other blocks is therefore said to be substantially non-customizable.

Integrated circuit 109 includes a first phase-locked loop circuit 153 and a second phase-locked loop circuit 154. Both use an external crystal 155 as a time base. First phase-locked loop circuit 153 generates an INCLK signal (1X) and a DDRCLK signal (2X). These signals are used to clock the various blocks to the left side of FIG. 3. INCLK goes to blocks 126, 139, and 140. Second phase-locked loop circuit 154 generates an output clock OUTCLK used to clock mask-programmable gate array portion 110 and to clock the various blocks to the right of FIG. 3. This clock signal OUTCLK is also driven off-chip to clock the synchronous logic within external FPGA in the test mode.

Mask-programmable gate array portion 110 is coupled to receive input signals from various sources within the remainder of integrated circuit 109. Mask-programmable gate array portion 110 is also coupled to supply output signals to various destinations within the remainder of integrated circuit 109. The interconnections for coupling mask-programmable gate array portion 110 to these sources and destinations are illustrated in FIG. 3.

Mask-programmable gate array portion 110 can, for example, perform customized enhancement motion detection, deinterlacing, and/or noise reduction functions in the place of process block 126 by receiving the signals passing into process block 126 via busses 156, 157, and 158. Mask-programmable gate array portion 110 can then supply its output in the place of the result otherwise output by process block 126. Mask-programmable gate array portion 110 supplies its outputs to FIFOs 130 and 141 via buses 159 and 160 and multiplexers 161 and 162, respectively.

Mask-programmable gate array portion 110 can, for example, perform customized enhancement scaler functions by receiving via bus 163 the signals passing into scaler block 133. Bus 164 and multiplexer 134 are usable to supply the output in the place of the output otherwise supplied by scaler block 133.

Mask-programmable gate array portion 110 can, for example, perform customized enhancement functions in the place of enhancement block 135. To do this, mask-programmable gate array portion 110 receives the information that would otherwise be used by enhancement block 135. It receives this information via FIFO 165 three pixels at a time in parallel fashion. First, FIFO 165 outputs three pixels, extending in the vertical direction, of pixel lines 1, 2 and 3. Next, FIFO 165 output three pixels extending in the vertical direction, of pixel lines 2, 3 and 4. This process of supplying three pixels to mask-programmable gate array portion 110 continues, top to bottom, and left to right, across the frame of pixels. The result of the enhancement function performed by mask-programmable gate array portion 110 is supplied in the place of the output of enhancement block 135. The output of the enhancement function is supplied to color space conversion block 138 via bus 166 and multiplexer 137.

Mask-programmable gate array portion 110 can, for example, perform customized enhancement functions in the place of color space conversion block 138 and/or gamma correction and dither block 141. Mask-programmable gate array portion 110 can, for example, perform a color space conversion different from the standard color space conversion performed by color space conversion block 138. To provide such an enhancement function or alternative color space conversion, the input to color space conversion block 138 is supplied to mask-programmable gate array portion 110 via bus 167. Enhance block 135 supplies a DCTINA active signal to mask-programmable gate array portion 110 to indicate when valid pixel data is present on 24-bit wide bus 167. The output of mask-programmable gate array portion 110 is supplied in the place of the output of gamma correction and dither block 141. This is performed using 24-bit wide bus 168 and multiplexer 142. Mask programmable gate array portion 110 outputs an active signal (not shown) along with the pixel data to indicate when valid pixel data is present on 24-bit wide bus 168.

Where pixel data is supplied across a bus to mask-programmable gate array portion 110 from a sourcing block, the sourcing block also supplies a corresponding active signal to indicate when valid pixel data is present on the bus. DCTINA and GMAINA are two such active signals. Similarly, where pixel data is supplied across a bus to a destination block from the mask-programmable gate array portion 110, the mask-programmable gate array portion 110 also supplies a corresponding active signal to indicate when valid pixel data is present on the bus. A signal SMXOA (not shown) is one such active signal supplied to enhance block 135 from mask-programmable gate array portion 110. A signal DCTMXA (not shown) is one such active signal supplied to color space conversion block 138 from mask-programmable gate array portion 110. A signal GMXOA (not shown) is one such active signal supplied to dual pixel block 144 from mask-programmable gate array portion 110. Pixel data is transferred synchronously with a clock signal. The receiving block can determine where the end of line is and where the end of frame is by counting pixels received. Alternatively, additional signals can be provided from the sourcing block to indicate end-of-line, end-of-frame, and other status conditions.

Some operations are better performed on pixel data in one color space, whereas other operations are better performed on pixel data in another color space. In accordance with one novel aspect, the mask-programmable gate array portion 110 is coupled to receive pixel data in two different color space formats (for example, the YCbCr format and the RGB format). White level enhancement, black level enhancement, color histogram extension, flesh-tone enhancement, horizontal DLTI, peaking filtering, display control and DCTI (Digital Chrominance Transient Improvement) are generally more easily performed in the YCbCr color space. Gamma correction and dithering are generally more easily performed in the RGB color space. In addition to the two (YCbCr and RGB) color space inputs, recall that mask-programmable gate array portion 110 receives pixel data of multiple different consecutive lines of pixels at one time as described above in connection with FIFO 165. The pixels supplied to the mask-programmable gate array portion 110 may be pixels from two previous lines of the frame as well as a pixel from the current line. Receiving pixel data from three such consecutive lines of pixels of a frame facilitates performing special interpolation enhancement functions in the mask-programmable gate array portion 110. Receiving pixel data from three consecutive lines of pixels also facilitates performing 2D noise reduction and vertical DLTI (Vertical Digital Luminance Transient Improvement) in the mask-programmable gate array portion 110.

Integrated circuit 109 includes I/O terminals 169. These I/O terminals include an external clock input terminal EXT-CLK 170, sixteen output terminals OUT 171, and sixteen input terminals IN 172. These I/O terminals are usable during system development to couple an external FPGA (not shown) to integrated circuit 109. The interface circuitry is not shown in FIG. 3. See FIG. 1 for details in accordance with one embodiment. The input signal sources 5 in FIG. 1 correspond to the various sources of signals being supplied into the mask-programmable gate array portion 110 in FIG. 3. The output signal destinations 6 in FIG. 1 correspond to the various destinations of signals being supplied from the mask-programmable gate array portion 110 to other parts of integrated circuit 109 in FIG. 3. The terminals 21 and 16 in FIG. 1 correspond to terminals 171 in FIG. 3. The terminals 18 in FIG. 1 correspond to terminals 172 and 170 in FIG. 3.

FIGS. 4-17 set forth one specific example of mask-programmable gate array portion 110. The example of FIGS. 4-17 is but one example. Any other suitable mask-programmable logic architectures can be used.

Figure 4:
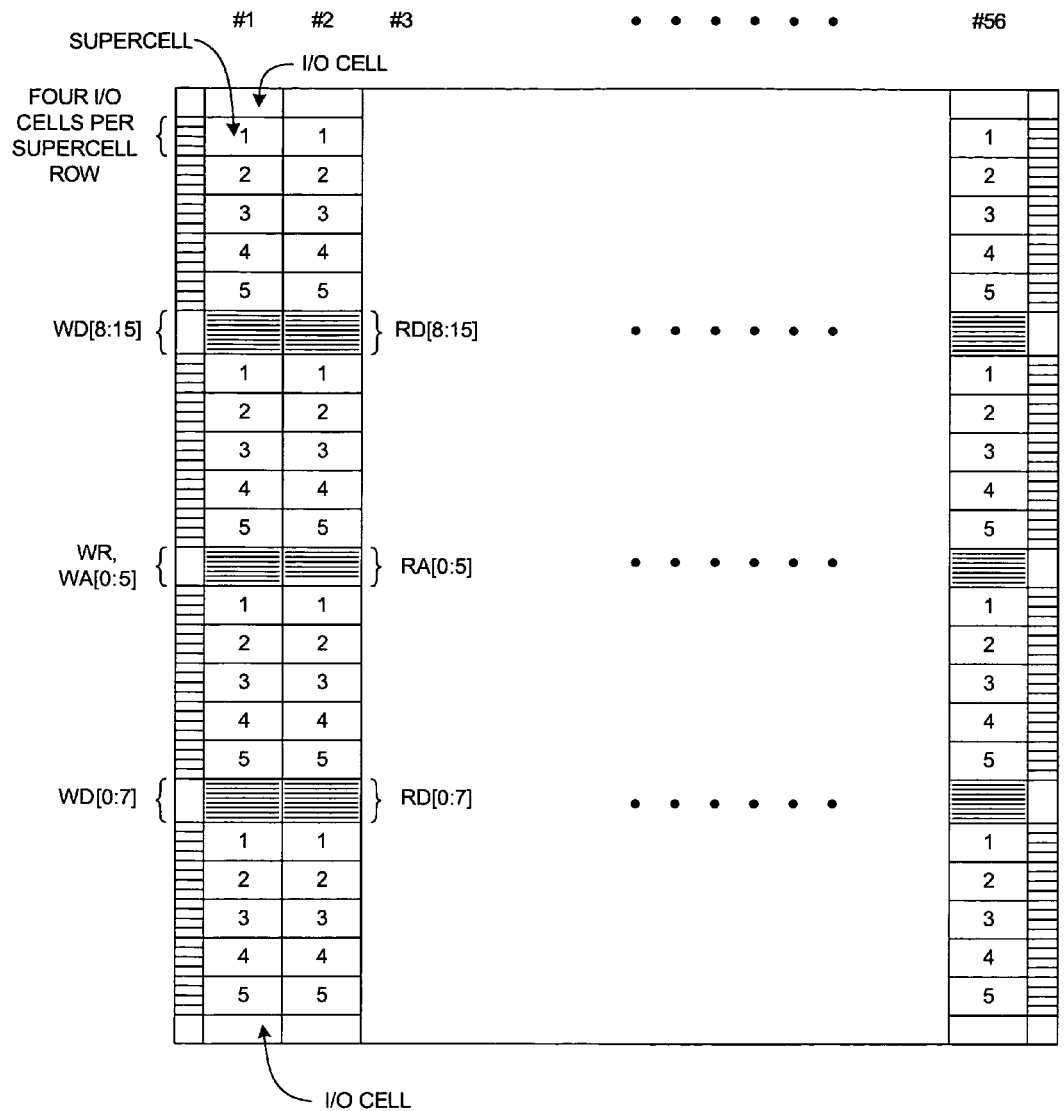
FIGS. 4-17 set forth one specific example the mask-programmable gate array portion of the integrated circuit of FIG. 3.

FIG. 4 is a top-down diagram of the floor plan of the mask-programmable gate array portion 110 of FIG. 3. Portion 110 is laid out as a plurality of tiles, principally organized in vertically extending columns. The tiles labeled with numerals from one to five in the diagram are called "supercells". Proceeding from top to bottom in each column of supercells, there are five supercells and then an area that contains horizontally-extending SRAM access and control lines. The horizontally extending access and control lines are disposed in the uppermost horizontally-extending layer of metalization of the integrated circuit. Although not illustrated in FIG. 4, there is one vertically extending SRAM block that extends down the center of each pair of columns of supercells. The WD notation indicates a write data line. The RD notation indicates a read data line. The RA notation indicates a read address line. The WR notation indicates a write strobe line. The WA notation indicates a write address line.

The supercells are organized in a two-dimensional matrix. As illustrated, there are 56 mcolumns of supercells in this example. Accordingly, there are 28 vertically extending SRAM blocks. Surrounding the two-dimensional matrix of supercells is a ring of input/output cells.

Figure 5:
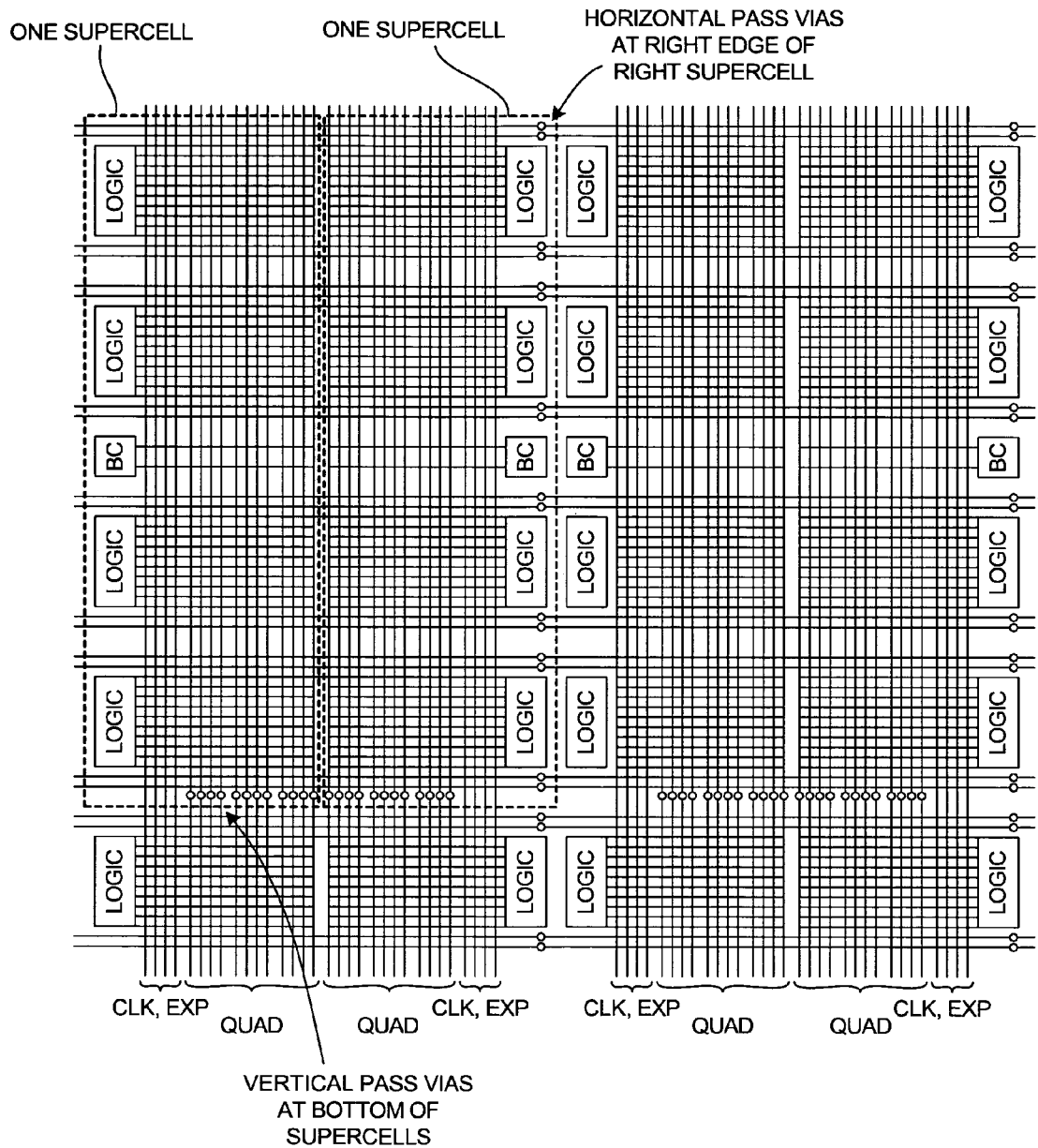

FIG. 5 is a more detailed top-down diagram of the structure of the supercells of FIG. 4. Extending from left to right across the two-dimensional matrix, successive supercells are laid out substantially as mirror images of one another. Note that the leftmost supercell in FIG. 5 includes four logic macrocells (labeled "LOGIC") organized in a column at the left. There is a buffer and clock cell (labeled "BC") between the upper two macrocells and the bottom two macrocells. This pattern is repeated in the next supercell to the right, except the macrocells and the buffer and clock cells appear on the right side of the next supercell. The two supercells to the left of FIG. 5 are not, however, exact mirror images of one another. Note that the rightmost supercell of the pair includes a set of horizontal pass via symbols at its right edge. Each horizontal pass via symbol represents a location at which a horizontal conductive pass via can either be disposed or be absent due to the customized via mask. Note also that there are also vertical pass via symbols illustrated at the bottoms of the pair of supercells. Again, each of these symbols represents a location at which a vertical pass via can either be disposed or be absent due to the customized via mask. The conductor lines extending the vertical dimension are labeled CLK, EXP and QUAD. The notation CLK indicates a conductor usable to transmit a clock signal. The notation EXP indicates an express conductor. An express conductor extends substantially the entire vertical length of the mask-programmable gate array portion 110. The notation QUAD indicates a signal conductor that extends a distance of four macrocells before it terminates at a vertical pass via location.

The horizontal conductors of the interconnect structure are realized on metal layer 4 (M4) of the integrated circuit. The vertical conductors of the interconnect structure are realized on metal layer (M5) of the integrated circuit. As illustrated, substantially the entire plane of the M5 layer is covered with vertically extending conductors, disposed as close together in parallel as is possible for the semiconductor process being used. In similar fashion, substantially the entire plane of the M4 layer is covered with horizontally extending conductors, disposed as close together in parallel as is possible for the semiconductor process being used. The density of these vertical and horizontal conductors in these layers in this architecture allows for the maximization of the number of potential cross-connect conductive via locations in the intervening layer. By maximizing the number of such potential cross-connect conductive via locations, only one conductive via layer need be customized and only one new mask need be made in order to make a customized version of integrated circuit 109. The equivalent gate density of the mask-programmable gate array portion is approximately 25 k usable gates per square millimeter using a 0.18 micron process, whereas the approximate equivalent gate density of the QuickLogic pASIC FPGA architecture is 2.5 k usable gates per square millimeter using a 0.18 micron process, and the approximate equivalent gate density of the Xilinx Virtex II FPGA architecture is 1.2 k usable gates per square millimeter using a 0.18 micron process.

Figure 6:
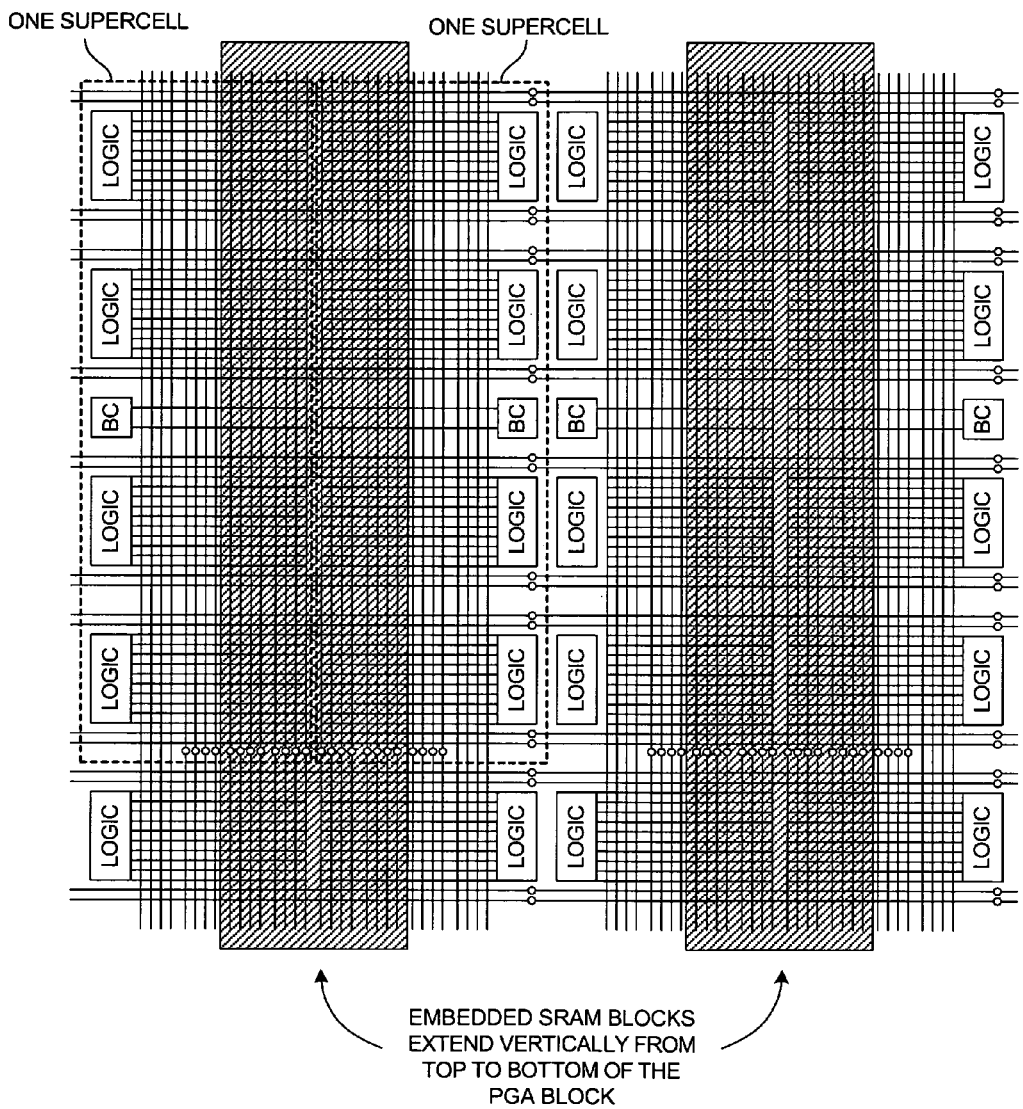

FIG. 6 is a diagram similar to the diagram of FIG. 5 except that FIG. 6 shows how the SRAM blocks are disposed underneath the metal conductors of the macrocells. The logic portion of the macrocells that involves transistors fabricated in the semiconductor substrate are disposed either at the left of the macrocell in the case of the left macrocell of the pair, or are disposed at the right of the macrocell in the case of the right macrocell of the pair. As a consequence of the mirroring of the macrocells, an area is formed between the left and right macrocells in which no macrocell logic is disposed. Only M4 and M5 macrocell interconnect is disposed in these areas. Because the SRAM blocks involve a relatively small amount of higher level interconnect that would interfere with the M4 and M5 macrocell interconnect, the SRAM logic (and lower-level interconnect necessary to interconnect the transistors making up the SRAM logic) is disposed in this area underneath the rightmost part of the left macrocell and the leftmost part of the right macrocell. The interconnects usable to connect to the underlying SRAM block are brought up to the uppermost layer of horizontally extending conductors (the M4 layer) at the locations indicated in FIG. 4. The SRAM blocks can be coupled to or not (by appropriate placement of conductive vias) at the locations indicated in FIG. 4.

Figure 7:
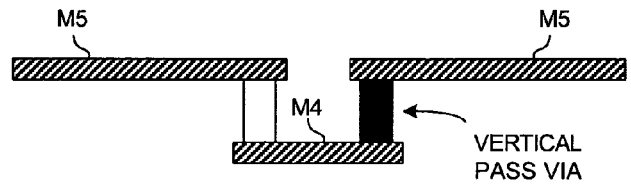

FIG. 7 is a simplified side view of a vertical conductive pass via. The top layer of metal is metal layer 5 (denoted M5) of the integrated circuit. The bottom layer of metal is metal layer 4 (denoted M4) of the integrated circuit. The conductive via (a conductive plug) connecting M5 and M4 to the left is a permanent conductive via in that it is present regardless of how the customizing mask is fashioned. The conductive via connecting M5 and M4 to the right represents a potential conductive via location. A conductive via may be disposed at this location or not depending on how the customizing mask is fashioned.

Figure 8:
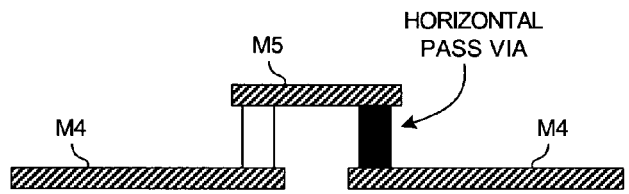

FIG. 8 is a simplified side view of a horizontal conductive pass via. The top layer of metal is metal layer 5 (denoted M5) of the integrated circuit. The bottom layer of metal is metal layer 4 (denoted M4) of the integrated circuit. The conductive via connecting M5 and M4 to the left is a permanent via in that it is present regardless of how the customizing mask is fashioned. The conductive via connecting M5 and M4 to the right represents a potential conductive via location. A conductive via may be disposed at this location or not depending on how the customizing mask is fashioned.

Figure 9:
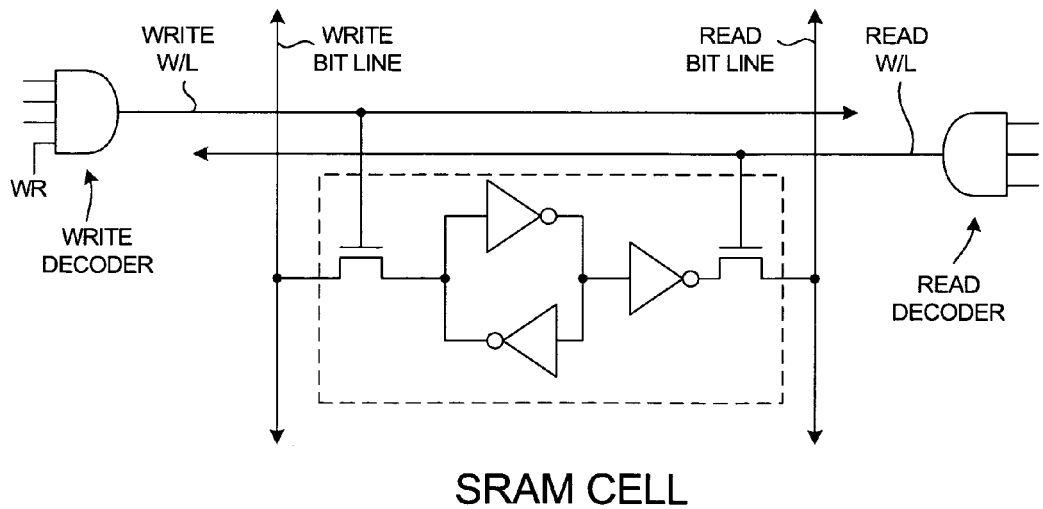
Figure 10:
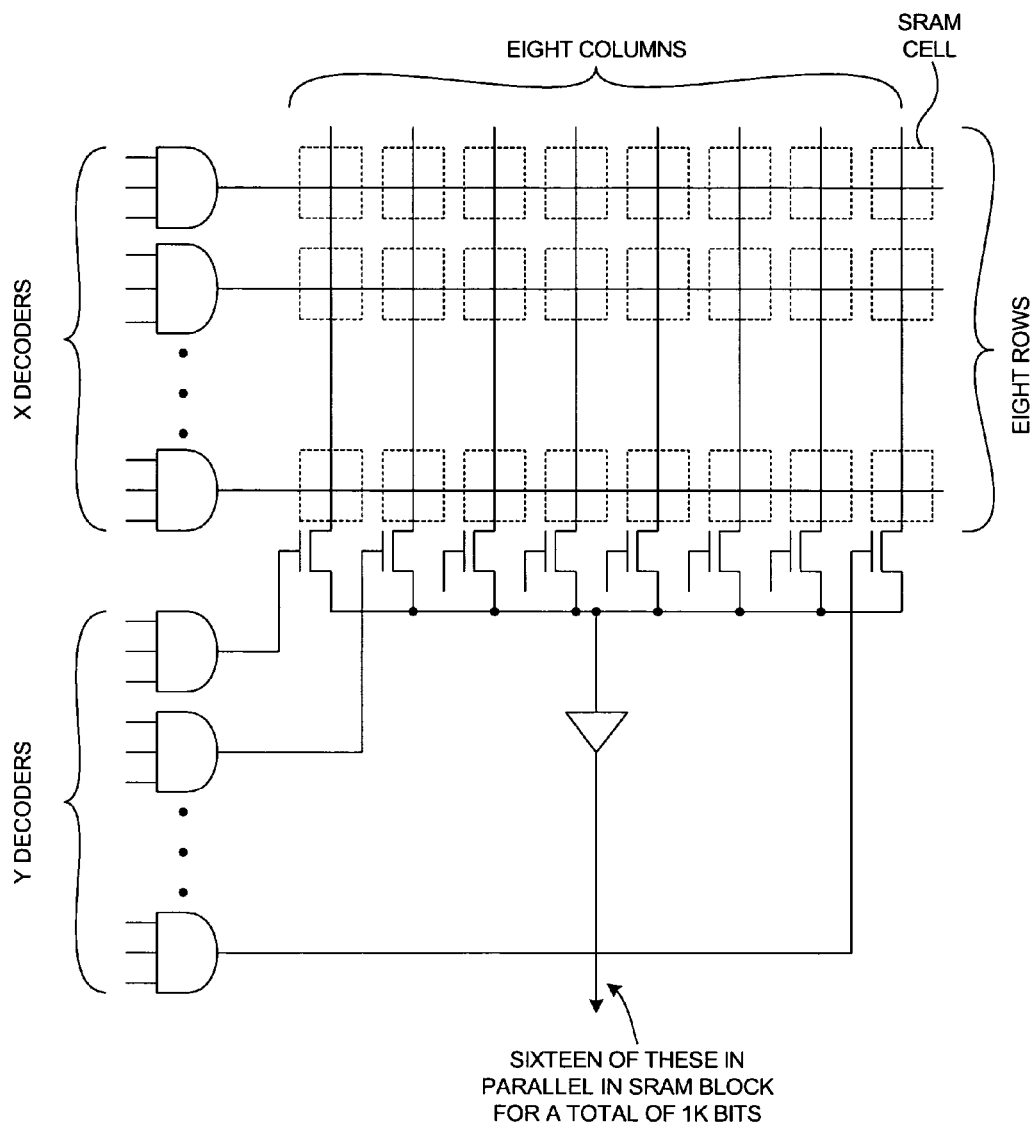

FIG. 9 is a simplified diagram of one cell of an SRAM block. FIG. 10 is a simplified diagram that illustrates a read decoder structure of one of the SRAM blocks. Each dashed box in FIG. 9 represents an instance of the SRAM cell structure of FIG. 9. Each SRAM block includes sixteen copies of the structure of FIG. 10. Accordingly, each SRAM block outputs sixteen bits at once.

Figure 11:
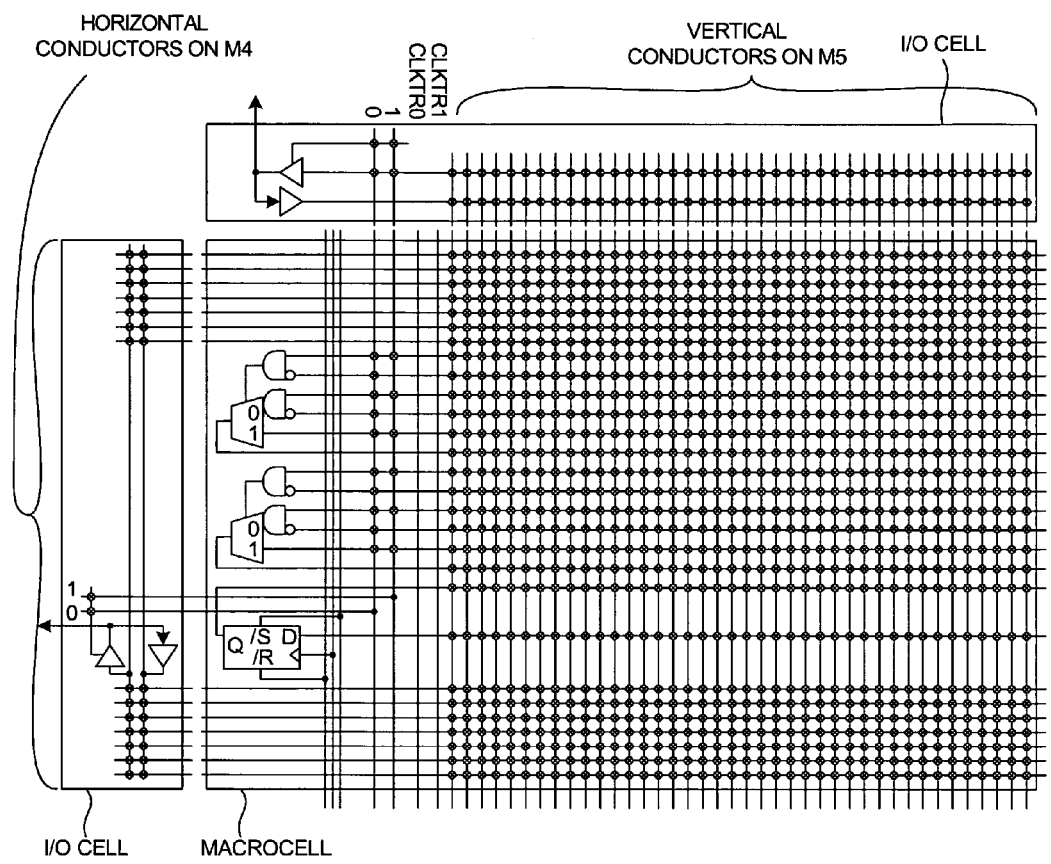

FIG. 11 is a more detailed diagram illustrating a macrocell structure, an input/output cell (I/O cell) located to its left, and an I/O cell located above it. The specific logic of the macrocell is illustrated at the left edge of the macrocell. The logic includes two AND gate-multiplexer structures and a flip-flop. The I/O cells provide input and output buffering required to link the mask-programmable gate array portion 110 to the various signal sources and destinations in the diagram of FIG. 3. In the illustration, the conductive via symbol represents a location at which a conductive via can be placed if desired.

Where the number of I/O cells of the mask-programmable gate array portion 110 is smaller than the number of sources and/or destinations to which the mask-programmable gate array portion 110 is to be coupled, additional multiplexing and/or demultiplexing functionality may be provided. An additional multiplexer may be provided to couple a selected one of multiple sources to an I/O cell (the I/O cell is being used to receive signals onto the mask-programmable gate array portion 110). Such an additional multiplexer may be controlled by the contents of one or more configuration register bits. Similarly, an additional demultiplexer may be provided to couple an I/O cell (the I/O cell is being used to output signals from the mask-programmable gate array portion 110) to a selected one of multiple destinations. Such an additional demultiplexer may be controlled by the contents of one or more configuration register bits. Rather than using a demultiplexer, each of the destinations can have a registered input such that a signal is supplied to all the inputs but only a selected one of the registered inputs is clocked. Which registered input is clocked may, for example, be controlled by the contents of one or more configuration register bits. Other ways of expanding the number of sources and destinations to which the mask-programmable gate array portion 110 is coupled are also possible.

Figure 12:
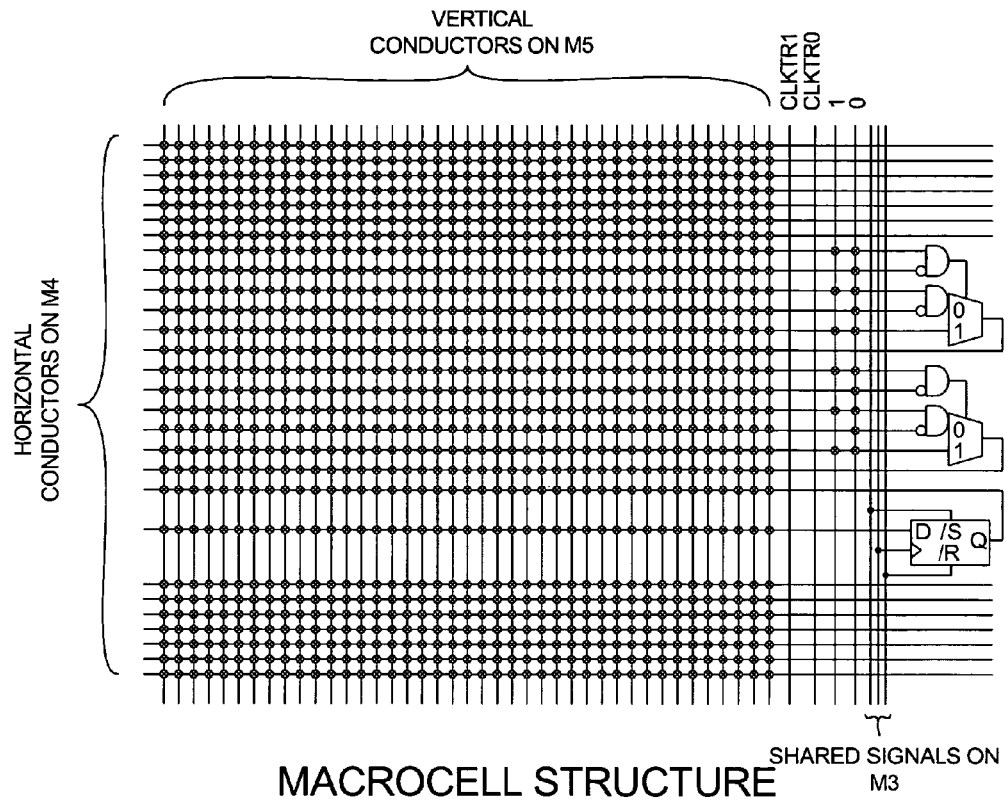

FIG. 12 is a detailed diagram of the macrocell structure wherein the logic of the macrocell is disposed at the right edge of the macrocell.

Figure 13:
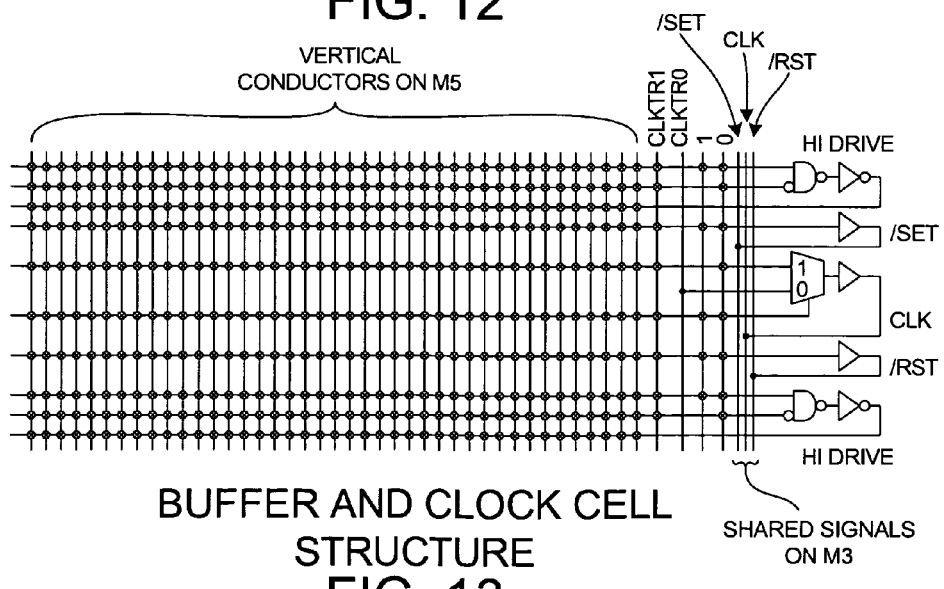

FIG. 13 is a detailed diagram of the buffer and clock cell ("BC") of FIG. 5. The shared signal conductors /SET, CLK and /RST illustrated in FIGS. 12 and 13 extend vertically in unbroken fashion the entire length of five supercells. The conductors denoted "1" and "0" also extend vertically in unbroken fashion the entire length of five supercells. These conductors are made wider and therefore more conductive than the other vertically extending conductors illustrate. The conductor labeled "1" is permanently coupled to VCC (supply voltage). The conductor labeled "0" is permanently coupled to ground potential.

Figure 14:
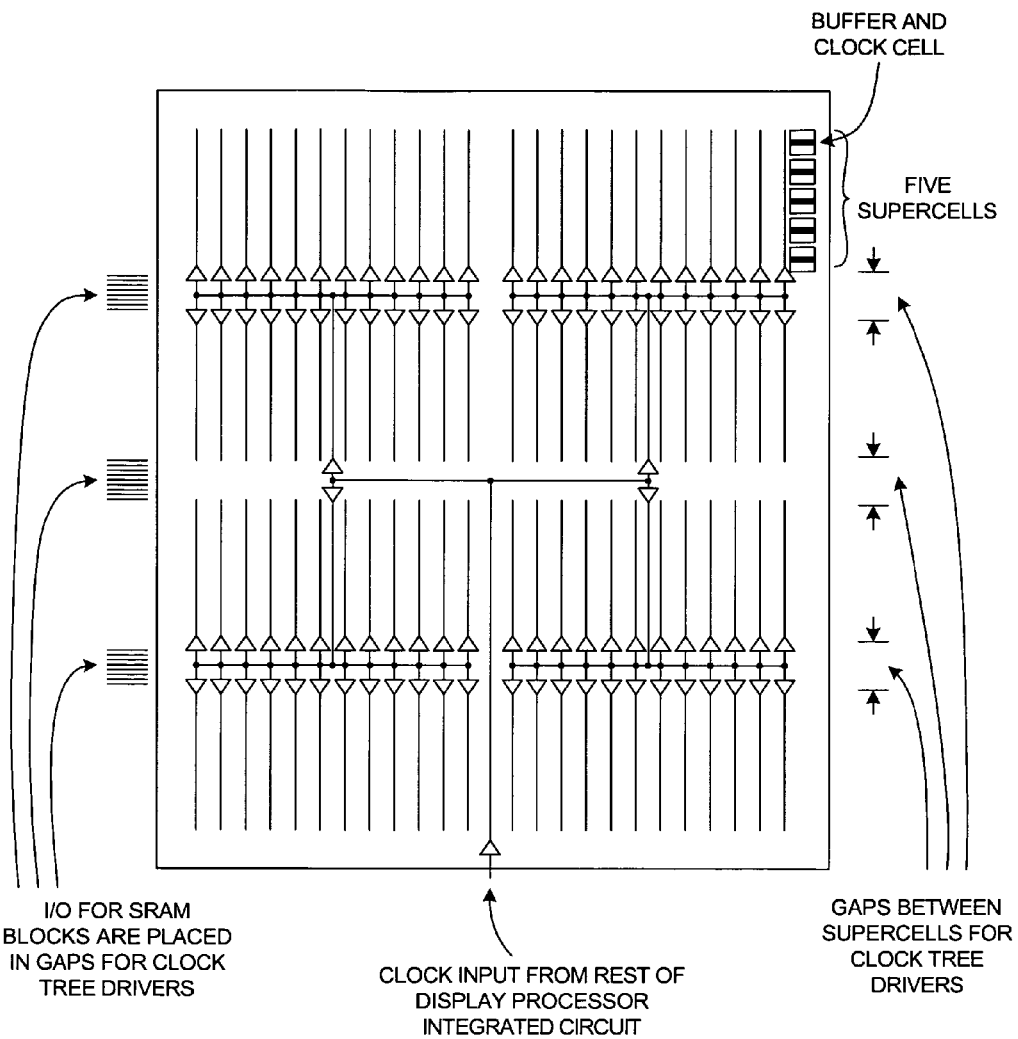

FIG. 14 is a simplified top-down diagram that shows a balanced clock tree structure of the mask-programmable gate array portion 110. This structure is replicated twice in the integrated circuit. The leaves of the first clock tree are denoted as CLKTR1 (clock tree one). The leaves of the second clock tree are denoted as CLKTR2 (clock tree two). The vertically extending clock tree leaf conductors CLKTR1 and CLKTR0 in FIG. 13 extend as illustrated in FIG. 14. The clock tree drivers of the balanced clock trees are disposed in the horizontal gaps where the input and output conductors for the SRAM blocks are located. There are three such gaps as illustrated in FIG. 14.

Figure 15:
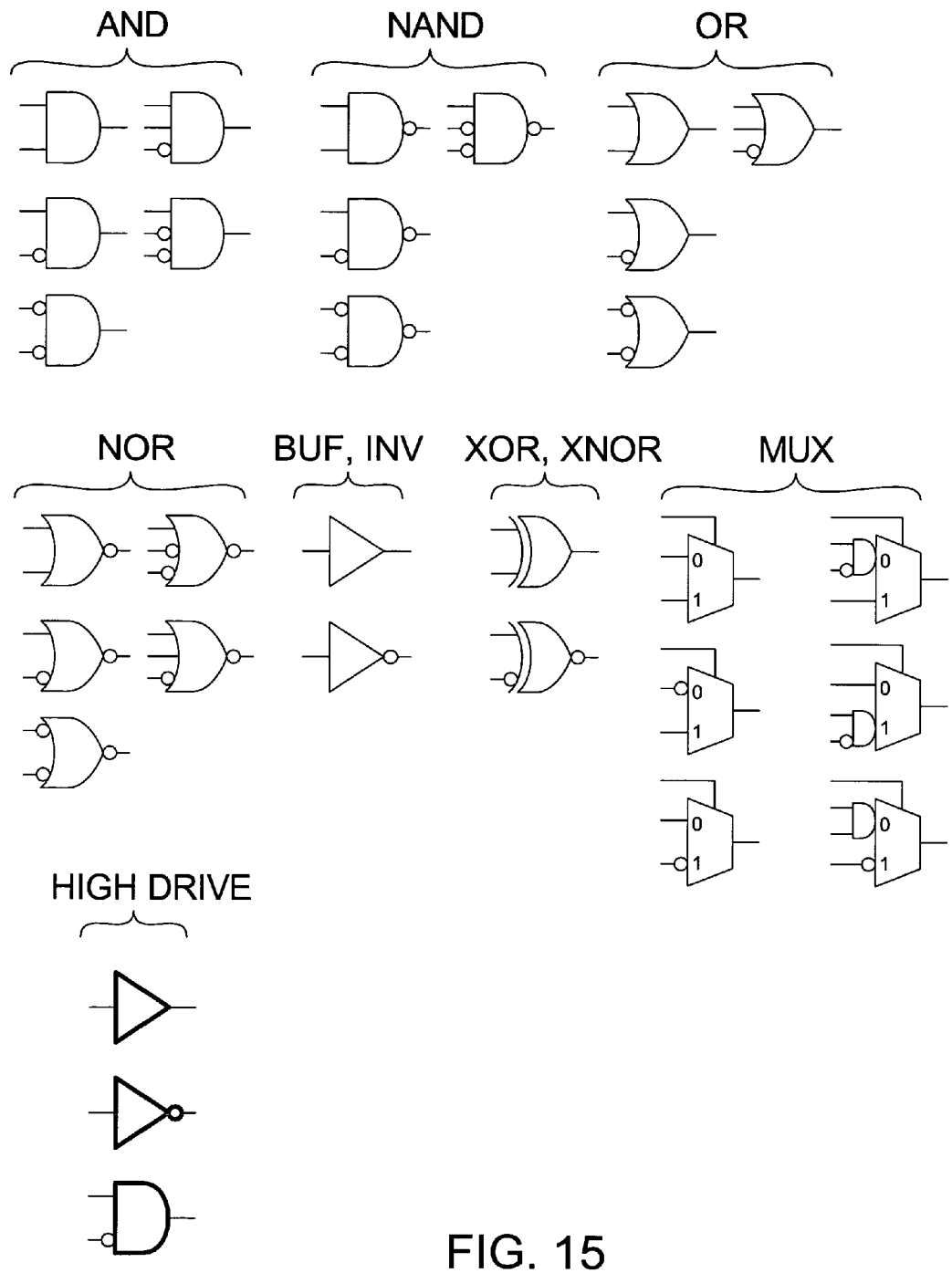
Figure 16:
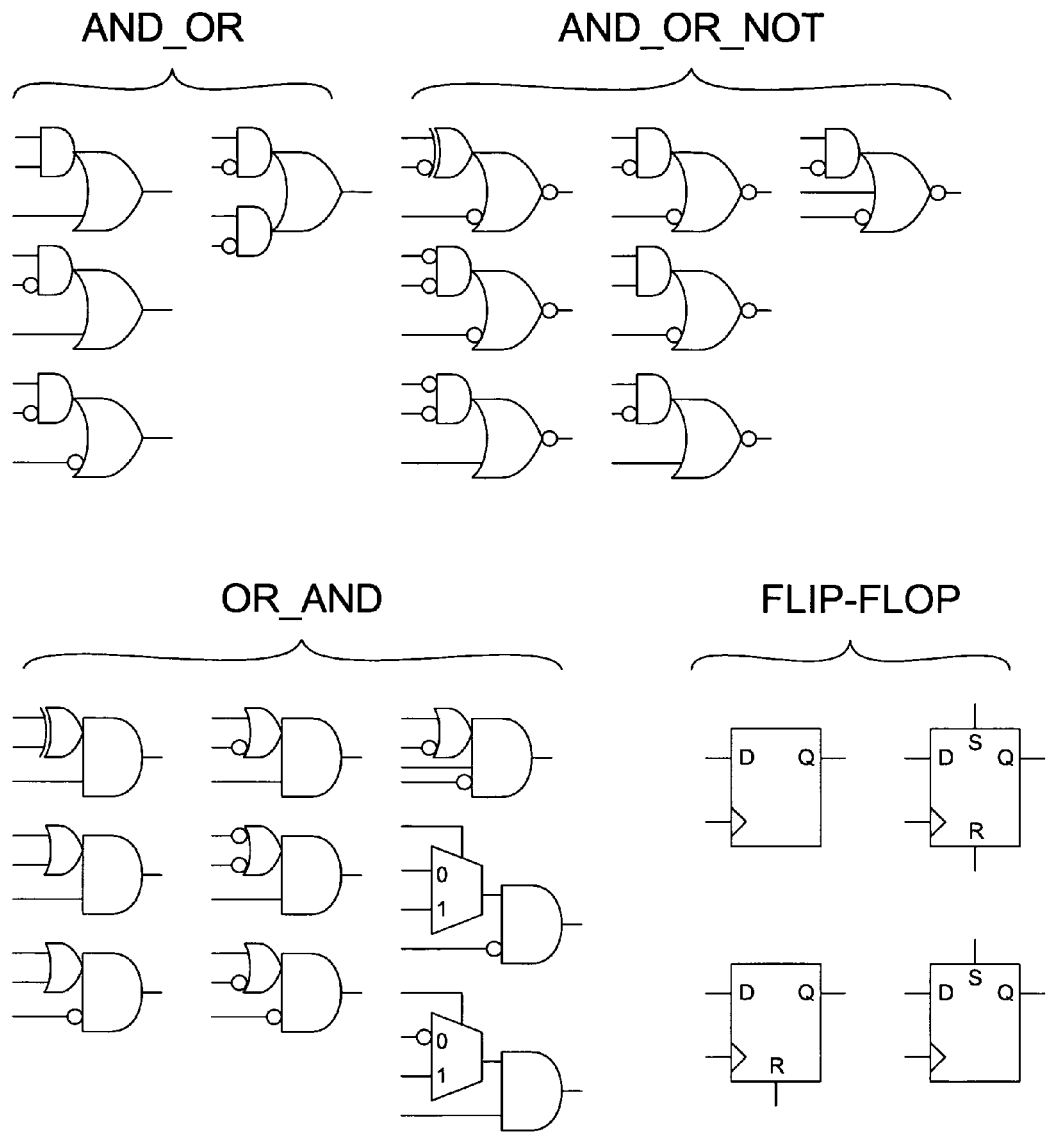

FIGS. 15 and 16 illustrate various logic gates and flip-flops that can be realized by configuring the macrocell of FIG. 12 is different ways.

Figure 17:
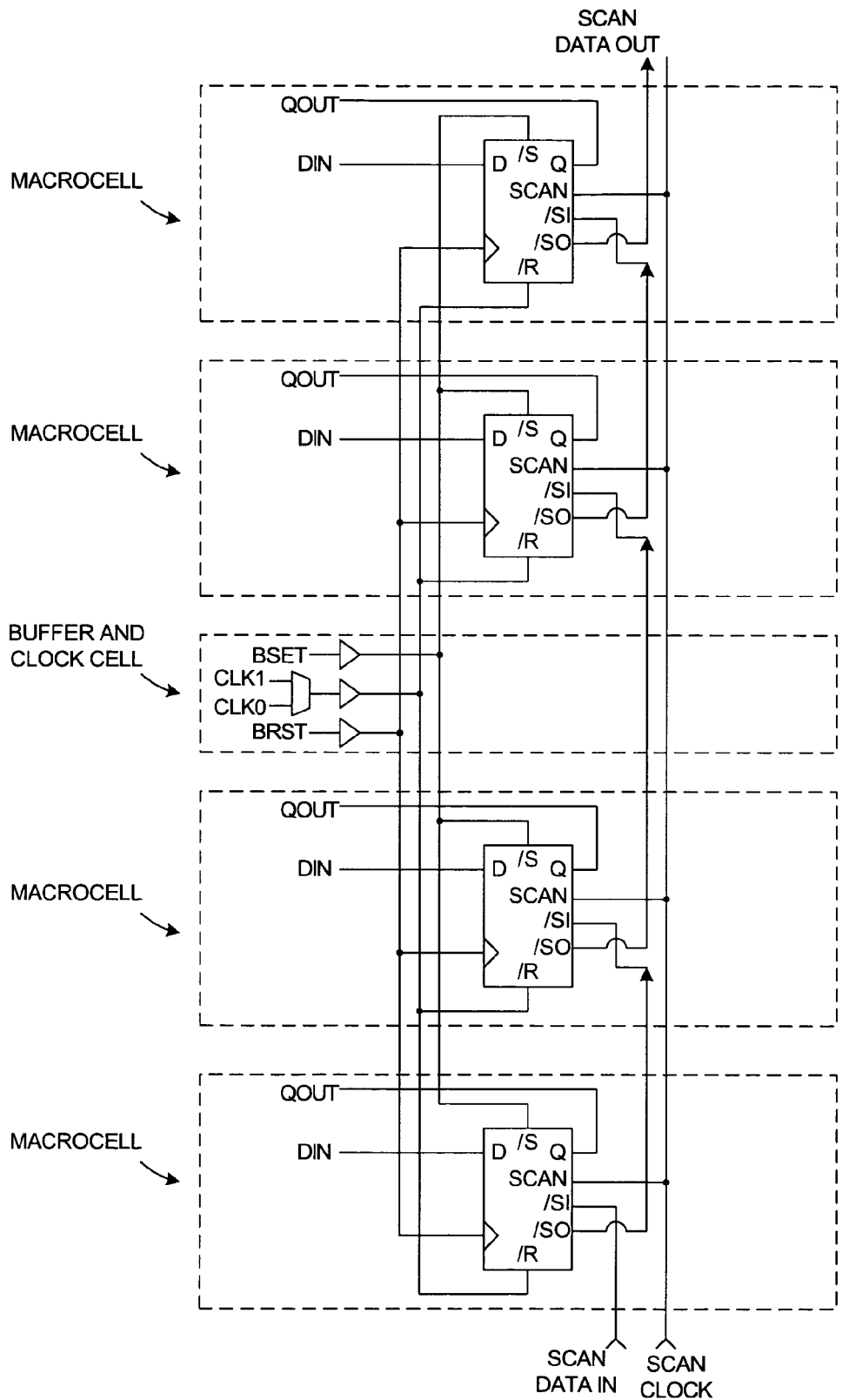

FIG. 17 is a simplified diagram that shows a scan test interconnection structure that links all the flip-flops of all the macrocells of mask-programmable gate array portion 110 together into one long scan test shift register chain. A scan test clock signal is supplied in a test mode onto the SCAN CLOCK clock line. Repeatedly clocking this scan test clock signal causes the contents of the flip-flops to be shifted out of the mask-programmable gate array portion 110 in serial fashion. On the flip-flop symbol, /SI denotes a scan test input lead, /SO denotes a scan test output lead, and SCAN denotes a scan clock input lead.

Figure 18:
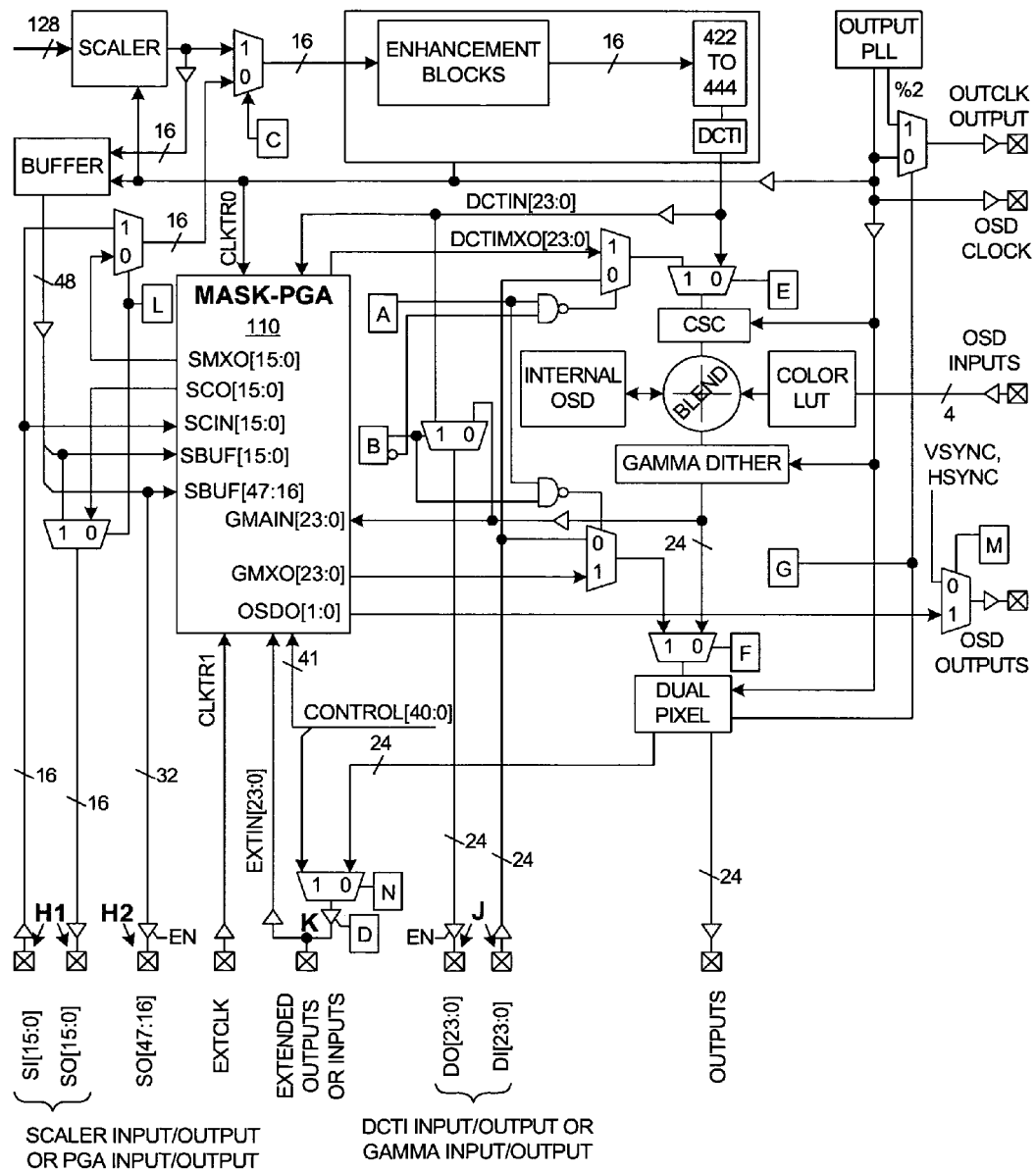
FIG. 18 is a diagram that illustrates interface circuitry in accordance with another specific embodiment.

FIG. 18 is a diagram illustrating interface circuitry and a mask-programmable gate array portion 110 in accordance with another specific embodiment. The I/O terminals illustrated are I/O terminals of integrated circuit 109. The small blocks labeled A, B, C, D, E, F, G, L, M and N are configuration register bits of a configuration register. The configuration register is writable via serial interface 148 (see FIG. 3) as described above. Control signals CONTROL[40:0] include the following inputs: sbufa, resetn, gmaina, dctina, hsync, vsync, vx_ctrl13[7:0], vx_ctrl14[7:0]; as well at the following outputs: smxoa, gmxoa, dctimxa, vx_ctrl15[7:0] and vx_ctrl16[7:0]. The following I/O terminals on the integrated circuit package are coupled on the system board during system development to an external FPGA: SI[15:0], SO[15:0], SO[47:16], EXTCLK, the EXTENDED OUTPUTS OR INPUTS K, DO[23:0], DI[23:0], OUTCLK OUTPUT, OSD CLOCK, OSD OUTPUTS, and OSD INPUTS.

Although the present invention is described in connection with certain specific embodiments for instructional purposes, the present invention is not limited thereto. The functionality of the serial interface that puts the integrated circuit into the test mode can, for example, be realized by a JTAG tap controller. The customizable portion 4 of the customizable ASIC that is provided to realize a manufacturer-specific enhancement function can include, in addition to a mask-programmable portion, other circuitry that can be used by a particular manufacturer such as, for example, a small processor, a block of memory, small pieces of analog circuitry, I/O circuitry, bus interface circuitry, and other small pieces of specialized circuitry (for example, full custom or standard cell circuitry) that might see use in a substantial subset of the systems of different manufacturers of a type of electronic consumer device. These small pieces of circuitry can be patched together and used by the appropriate programming of a programmable interconnect structure of mask-programmable gate array portion 4. The programmable interconnect structure may, for example, be programmable by changing only one layer of conductive vias where that layer of conductive vias is the same layer of conductive vias that customizes a mask-programmable gate array portion as set forth above. The interface circuitry need not involve one set of output terminals and one set of input terminals. The interface circuitry may, for example, involve bidirectional communication between the customizable ASIC and the external FPGA across a bus or other link. Control of the interface circuitry need not be across a serial interface from an external control source. The interface circuitry can be controlled in any suitable manner such as, for example, via the I/O terminals across which the customizable ASIC communicates with the external FPGA. The interface circuitry may be put into its test mode by putting a specific pattern onto one or more I/O terminals of the customizable ASIC. Mask-programmable gate array portion 110 can also, in some embodiments, communicate directly with memory control block 123 such that mask-programmable gate array portion 110 can cause memory control block 123 to retrieve certain information from SDRAM 115 and forward that information to a designated place, such as to mask-programmable gate array portion 110. Similarly, mask-programmable gate array portion 110 can communicate directly with memory control block 123 thereby causing memory control block to store certain information (for example information received from mask-programmable gate array portion) into SDRAM 115. Where a block of the substantially non-customizable hardware portion operates in response to commands, the mask-programmable gate array portion can issue such commands to the block. In one example, memory control block 123 involves a DMA engine that executes DMA commands it receives from a DMA command queue. Mask-programmable gate array portion 110 can push a command onto the DMA command queue of the DMA engine such that the DMA engine later receives the command from the DMA command queue and executes the DMA command. The DMA command can include an indication of a source and an indication of a destination for the information to be moved. In one example, the mask-programmable gate array portion 110 can be directly coupled to an additional external memory integrated circuit in the production version of the system. Accordingly, various modifications, adaptations, and combinations of various features of the described embodiments can be practiced without departing from the scope of the invention as set forth in the following claims.

What is claimed is:

1. An integrated circuit, comprising:
   a substantially non-customizable hardware portion;
   a mask-programmable gate array portion; and
   interface circuitry capable of supplying, in a test mode, a first signal output from a source in the substantially non-customizable hardware portion to a first interface cell, the interface circuitry also being capable of supplying, in the test mode, a second signal received on a second interface cell to a destination in the substantially non-customizable hardware portion, the interface circuitry also being capable of supplying, in a normal operation mode, a third signal output from the source to the mask-programmable gate array portion, the interface circuitry also being capable of supplying, in the normal operation mode, a fourth signal output from the mask-programmable gate array portion to the destination, wherein the source outputs only a single signal at a time, and wherein the destination only receives a single signal at a time.

2. The integrated circuit of claim 1, wherein the substantially non-customizable hardware portion performs a video processing function.

3. The integrated circuit of claim 2, wherein the interface circuitry is adapted for coupling to an external field programmable gate array in the test mode.

4. The integrated circuit of claim 3, wherein the integrated circuit is a packaged integrated circuit having a package, wherein the first interface cell is coupled to a first terminal of the package, and wherein the second interface cell is coupled to a second terminal of the package.

5. The integrated circuit of claim 4, wherein the interface circuitry includes a serial interface, the serial interface being usable to place the interface circuitry into the test mode.

6. The integrated circuit of claim 1, wherein a clock signal output by the substantially non-customizable hardware portion in the test mode is supplied by the interface circuitry onto a third interface cell of the integrated circuit.

7. The integrated circuit of claim 1, wherein the second interface cell is usable in the normal operation mode to couple circuitry external to the integrated circuit to the mask-programmable gate array portion.

8. The integrated circuit of claim 1, wherein in the normal operation mode a first portion of the mask-programmable gate array portion implements a first function, the first portion of the mask-programmable gate array portion being operatively coupled to the substantially non-customizable hardware portion, and wherein in the normal operation mode a second portion of the mask-programmable gate array portion implements a second function, the second portion of the mask-programmable gate array portion being operatively coupled via the interface circuitry to circuitry external to the integrated circuit.

9. The integrated circuit of claim 1, wherein the mask-programmable gate array portion is programmable by customizing a single layer of conductive vias.

10. The integrated circuit of claim 1, wherein the substantially non-customizable hardware portion includes a plurality of functional blocks, and where at least some of the functional blocks are configurable by writing to a configuration register of the integrated circuit.

11. An integrated circuit, comprising:
    a substantially non-customizable hardware portion;
    an interface circuit adapted to couple an external field programmable gate array to the integrated circuit during a test mode such that during the test mode the field programmable gate array performs a function using inputs signals received from sources in the substantially non-customizable hardware portion and such that the field programmable gate array outputs output signals to destinations in the substantially non-customizable hardware portion; and
    a mask-programmable logic portion coupled to receive in a normal operation mode input signals from the sources in the substantially non-customizable hardware portion, the mask-programmable logic portion being coupled in the normal operation mode to supply output signals to the destinations in the substantially non-customizable hardware portion, wherein the external field programmable gate array is not coupled to the integrated circuit during the normal operation mode.

12. The integrated circuit of claim 11, wherein the integrated circuit is part of a video display device, wherein the substantially non-customizable hardware portion performs a video processing function.

13. The integrated circuit of claim 11, wherein the integrated circuit is part of a mass-produced electronic consumer device.

14. The integrated circuit of claim 11, wherein the interface circuit includes a plurality of interface cells that communicate signals from the integrated circuit to the field programmable gate array during the test mode, and wherein the interface circuit includes a plurality of interface cells that communicate signals from the field programmable gate array to the integrated circuit during the test mode.

15. The integrated circuit of claim 11, wherein the interface circuit includes a multiplexer that supplies one of either: 1) the output signals output by the mask-programmable logic portion, or 2) the output signals received from the external field programmable gate array, to the destination in the substantially non-customizable hardware portion.

16. An integrated circuit comprising:
a substantially non-customizable hardware portion that performs a first function;
a mask-programmable logic portion that is programmable to perform a second function in a normal operation mode; and
means for coupling an external field programmable gate array to the integrated circuit such that the external field programmable gate array performs the second function in a test mode in place of the mask-programmable logic portion.

17. The integrated circuit of claim 16, wherein the first function is a common function performed by first electronic consumer devices of a first company and by second electronic consumer devices of a second company, and wherein the second function is a specialized function performed by the first electronic consumer devices of the first company and not performed by the second electronic consumer devices of the second company.

* * * * *